(12) United States Patent  (10) Patent No.: US 7,471,852 B2
Hamada  (45) Date of Patent: Dec. 30, 2008

(54) OPTICAL MODULATOR AND OPTICAL MODULATION METHOD

(75) Inventor: Hidenobu Hamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/867,866

(22) Filed: Oct. 5, 2007

(65) Prior Publication Data

US 2008/0084597 A1  Apr. 10, 2008

(51) Int. Cl.
  *G02F 1/035* (2006.01)
  *G02F 1/295* (2006.01)
(52) U.S. Cl. ............................................. 385/2; 385/8
(58) Field of Classification Search ...................... 385/2, 385/8
  See application file for complete search history.

(56) References Cited

U.S. PATENT DOCUMENTS 5,067,788 A  11/1991  Jannson et al.
6,034,809 A *  3/2000  Anemogiannis ............ 359/254
6,611,367 B1  8/2003  Naya et al.

FOREIGN PATENT DOCUMENTS

| JP | 60-117210 A | 6/1985 |
| JP | 5-313108 A | 11/1993 |
| JP | 2000-314859 A | 11/2000 |

* cited by examiner

*Primary Examiner*—Charlie Peng
(74) *Attorney, Agent, or Firm*—RatnerPrestia

(57) ABSTRACT

An optical modulator has a waveguide on which propagation light is incident, a metal layer located adjacent to the waveguide and having a periodic structure which periodically extends along at least in a propagation direction of the waveguide, and a dielectric layer located adjacent to a surface of the metal layer which is opposite a surface to which the waveguide is adjacent, the dielectric layer having an electrooptical effect.

13 Claims, 17 Drawing Sheets

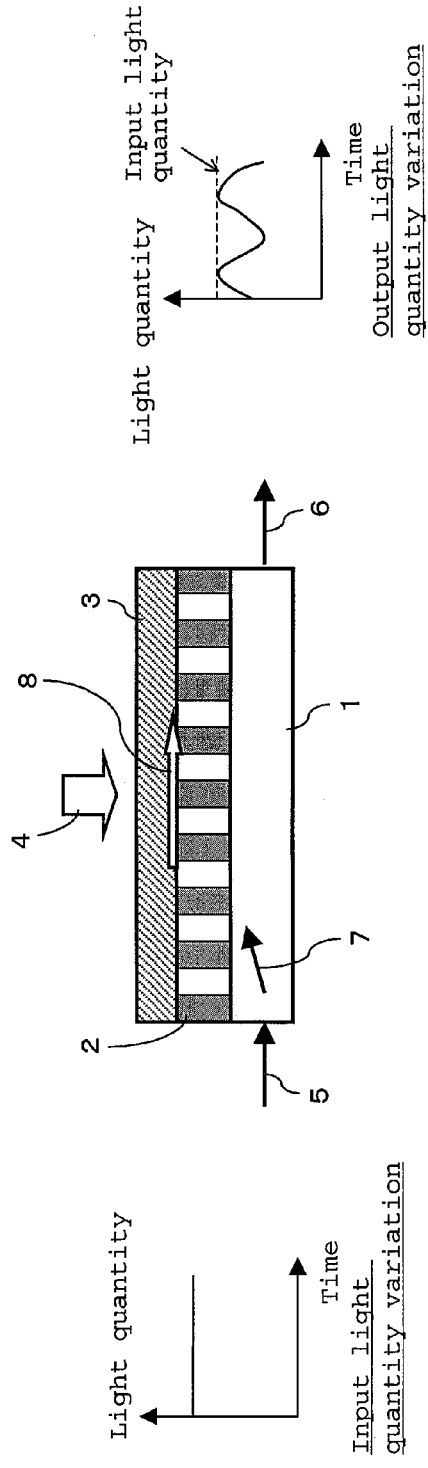
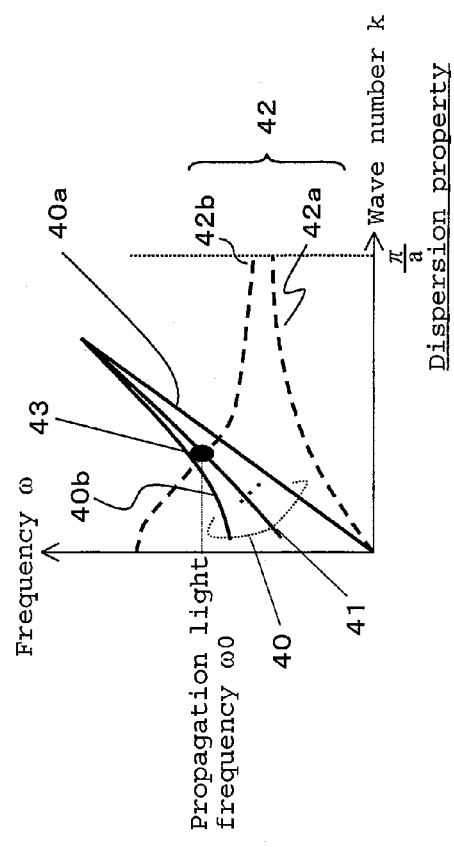
Fig.1(A)
Fig.1(B)

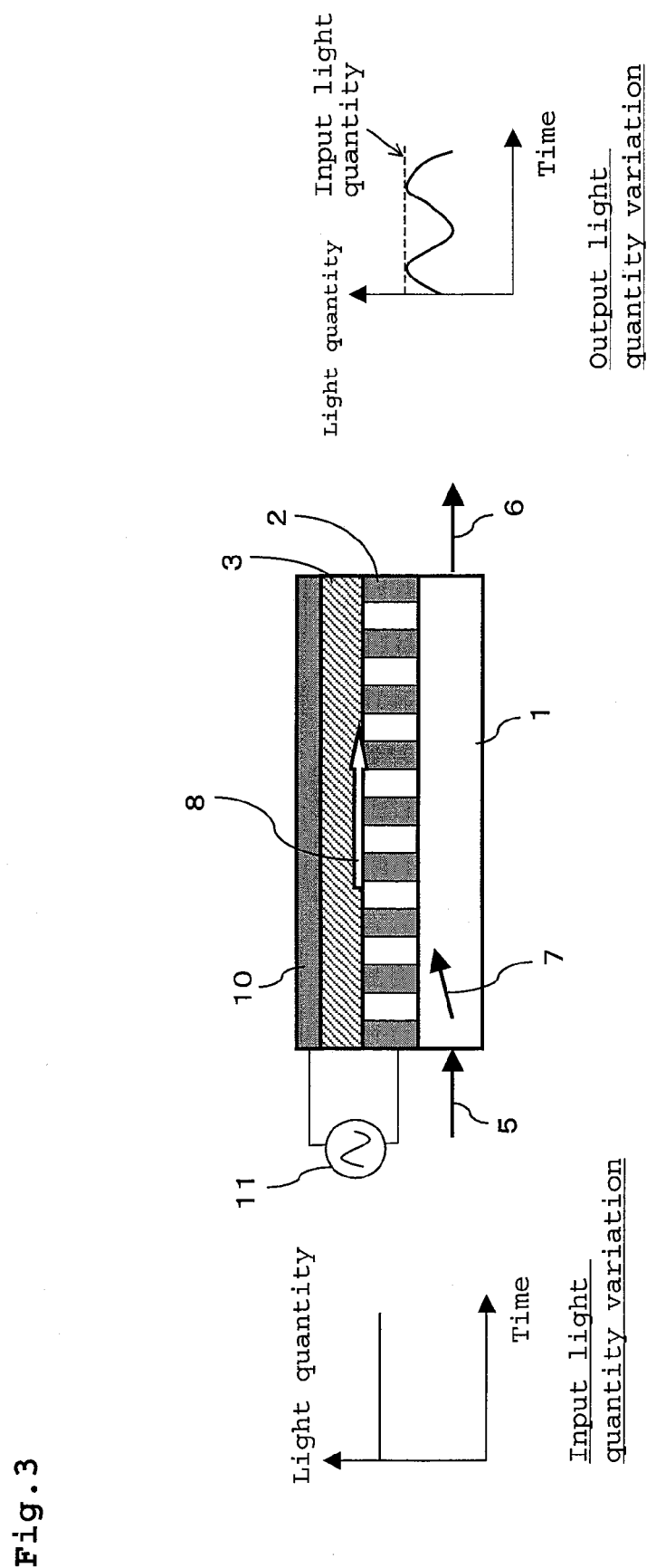

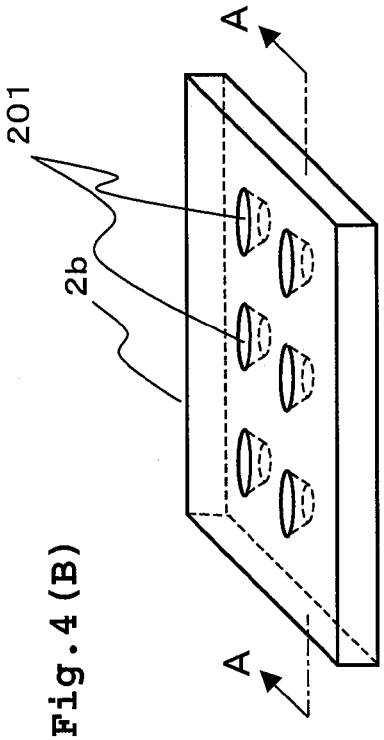
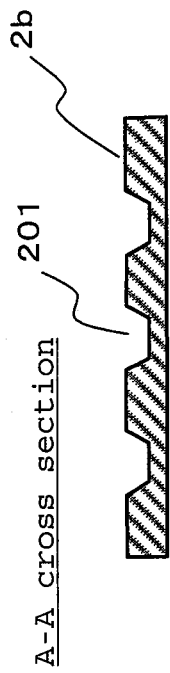
Fig.4(B)
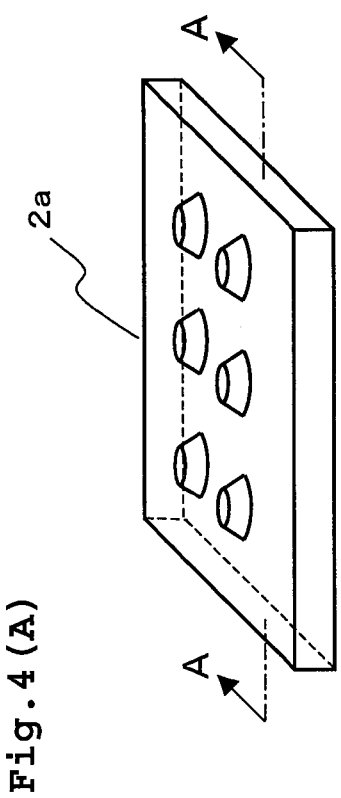
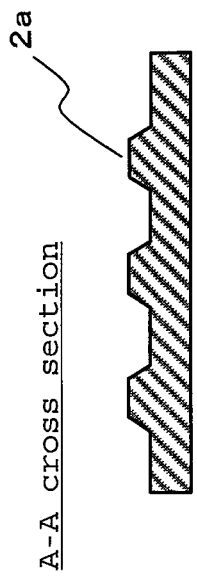
Fig.4(A)

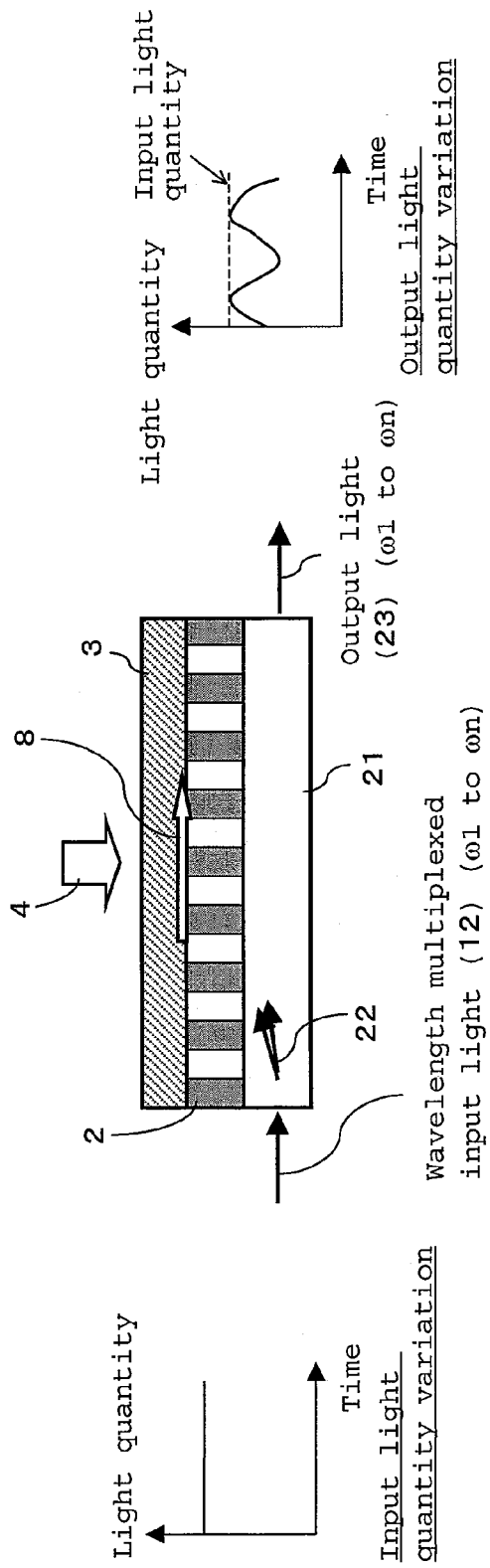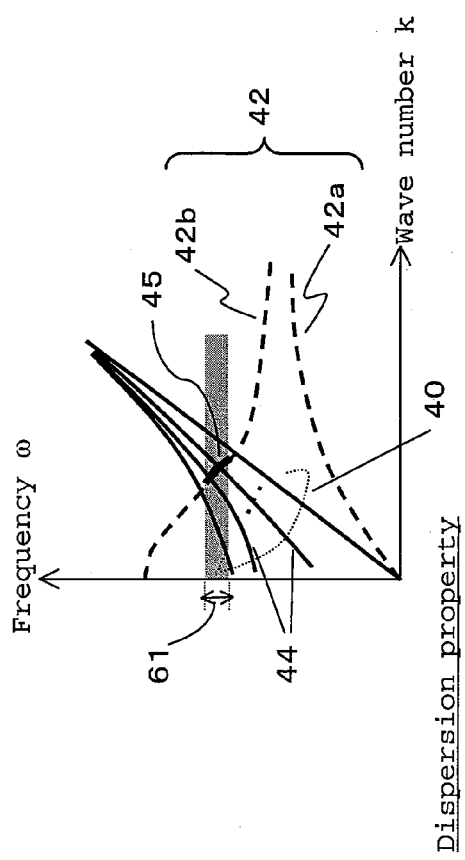
Fig.5 (A)
Fig.5 (B)

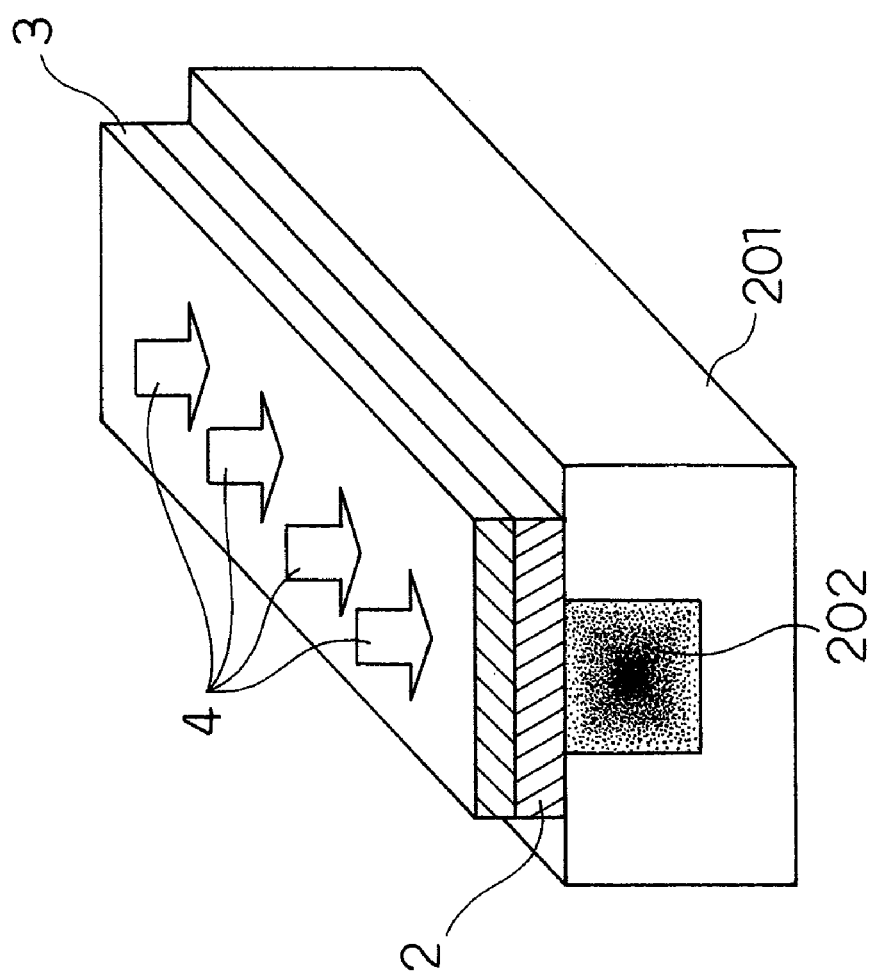
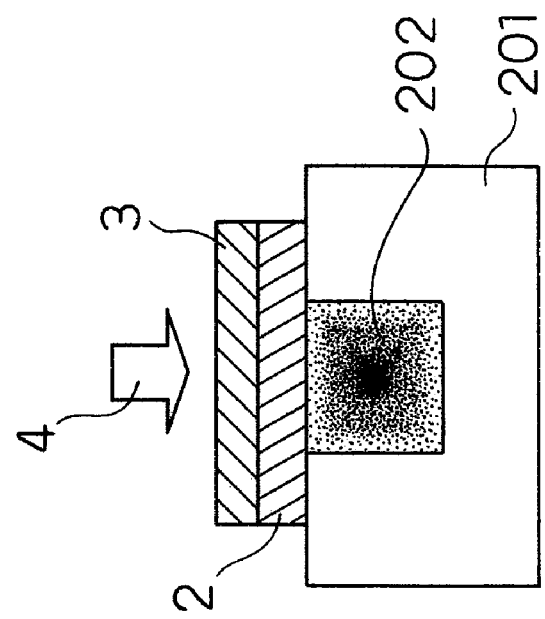
Fig.10(A)
Fig.10(B)

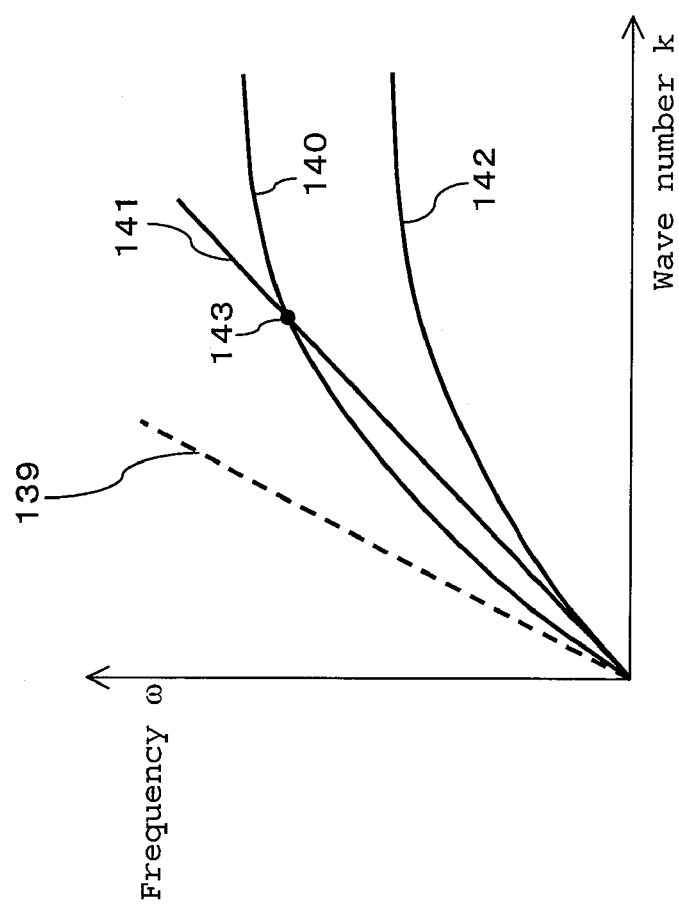
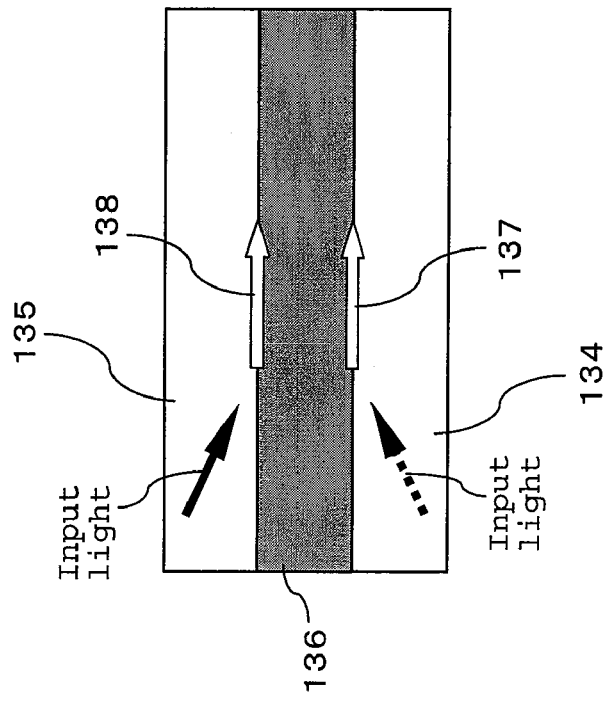
Fig.15(A)
Fig.15(B)

OPTICAL MODULATOR AND OPTICAL MODULATION METHOD

BACKGROUND OF THE INVENTION

1. Field of the Invention

The present invention relates to an optical modulator and an optical modulation method which are used in optical communications. For example, the present invention relates to an optical modulator and an optical modulation method which modulates light intensity on the basis of interaction between light and surface plasmons.

2. Related Art of the Invention

Optical modulation methods for optical communications are classified into a direction modulation scheme in which a light source is modulated using a driving current and an indirect modulation scheme in which propagation light is modulated by allowing the propagation light to interact with electrons and polarization in a transmission path controlled using an external physical quantity.

The direct modulation scheme is limited in terms of high-speed modulation owing to the presence of the threshold current and capacity of a light source. The indirect modulation scheme is thus used for high-speed modulation.

Typical examples of the indirect modulation scheme include a transmission type in which an electrooptical material such as $LiNbO_3$ or KTP is utilized to substitute phase-modulated orthogonal polarization into intensity modulation through interference and a mode coupling type in which the resonance between surface plasmons (SP) and photons are utilized to modulate transmission light quantity.

However, with current materials, the transmission type needs to form such a waveguide as reduces electrode interval down to a 10-μm width in order to increase sensitivity up to a practical level. Realization of such a small electrode interval requires high manufacturing costs, resulting in high prices. Thus, the mode coupling type is advantageous in terms of costs.

One mode coupling type indirect modulation scheme applies a high-frequency voltage to the interface between metal and an insulator to resonate the insulator to generate surface plasmons localized at the interface between the metal and the insulator. The surface plasmons are coupled with propagation light in a waveguide provided adjacent to the insulator to modulate the propagation light (see, for example, Japanese Patent Laid-Open No. 5-313108).

FIG. 13 shows a side sectional view of a surface plasmon wave modulator disclosed in Japanese Patent Laid-Open No. 5-313108.

The surface plasmon wave modulator 110 has a flat multi-layer structure made of two metal electrodes 118A, 118B, a photoelectric material 120 sandwiched between the metal electrodes 118A, 118B, two layers of a coating material 114 located opposite the photoelectric layer 120, and a flat single mode waveguide 112 sandwiched between the two layers of the coating material 114. Furthermore, a thin buffer layer 116 (0.1 μm) is provided between the metal electrode 118A and the coating material 114.

The waveguide 112 is formed of a transparent material such as glass. The waveguide 112 has an extremely small thickness of 6 μm and only one light wave mode occurs inside the waveguide 112.

The photoelectric material 120 is formed of a photoelectric polymer having a smaller refractive index than the waveguide 112. The refractive index of the photoelectric material 120 is varied by a voltage applied to the metal electrodes 118A, 118B.

Two different modes occur in the surface plasmon wave modulator 110, a core mode induced by the waveguide 112 and a surface plasmon wave interface mode occurring at the interface between the layers of the metal electrode 118A and the photoelectric material 120. Energy from the guided core mode is resonantly coupled to the surface plasmon wave interface mode when the phase speeds of the two modes match. The phase match conditions are controlled by applying an electric field to vary the refractive index of the photoelectric material 120.

A TM polarization component of a light wave is coupled to the surface plasmon wave interface mode. Consequently, the power of TM polarized incident light is coupled to the surface plasmon wave interface mode under the phase match conditions. Therefore, the output power level is controlled by the electric field applied to the photoelectric material 120.

However, with the conventional surface plasmon wave modulator, to allow surface plasmons localized at the interface between the insulator film (photoelectric material 120) and the metal film to resonate with modulated light, it is necessary to select, as an insulator film, a low-refractive-index material having a smaller refractive index than the waveguide 112 through which the modulated light propagates. Thus, the range of material selection is conventionally narrow. Disadvantageously, very few types of insulator materials have a smaller refractive index than glass and resin, which are commonly used as a waveguide material (glass and resin have a refractive index of about 1.5). Further, it has been impossible to use a high dielectric having a large electrooptical constant.

This problem will be described below. Specifically, the mechanism of optical modulation based on the resonance between surface plasmons and the waveguide mode will be described using dispersion properties.

First, description will be given of a case in which light is incident on a dielectric layer in a two-layer structure including the dielectric layer and a metal layer.

FIG. 14(A) shows a schematic sectional view of a case in which light is incident on a two-layer structure including a dielectric layer and a metal layer. FIG. 14(B) shows the properties of the dispersion of photons and surface plasmons in the dielectric layer in the two-layer structure including the dielectric layer and metal layer.

The inclination of a dispersion curve 132 for photons advancing through the dielectric layer 130 corresponds to a straight line determined by the refractive index of the dielectric layer 130 as shown in FIG. 14(B). In contrast, a dispersion curve 133 for surface plasmons localized at the interface between the dielectric layer 130 and the metal layer 131 always has a greater wave number than the dispersion curve 132 for the photons. The dispersion curve 133 draws a curve approximating a curve for a plasma frequency and has no intersecting point with the dispersion curve 132 for the photons in the dielectric layer. That is, the photons in the dielectric cannot in principle be coupled to the surface plasmons localized at the metal interface, located adjacent to the dielectric.

Now, description will be given of a case in which light is incident on a dielectric layer in a three-layer structure including a low-refractive-index dielectric layer, a metal layer, and a high-refractive-index dielectric layer.

FIG. 15(A) shows a schematic sectional view of a case in which light is incident on a three-layer structure including a low-refractive-index dielectric layer, a metal layer, and a high-refractive-index dielectric layer. FIG. 15(B) shows the properties of the dispersion of photons and surface plasmons in the dielectric layer in the three-layer structure including the low-refractive-index dielectric layer, the metal layer, and the high-refractive-index dielectric layer.

As shown in FIG. 15(B), when light is incident from the high-refractive-index dielectric layer 135, a dispersion curve 141 for photons advancing through the high-refractive-index dielectric layer 135 has no intersecting point with a dispersion curve 142 for surface plasmons 138 localized at the interface between the high-refractive-index dielectric layer 135 and the metal layer 136. When it is assumed that light is incident from the low-refractive-index dielectric layer 134, a dispersion curve 139 for photons advancing through the low-refractive-index dielectric layer 134 has no intersecting point with a dispersion curve 140 for surface plasmons 137 localized at the interface between the low-refractive-index dielectric layer 134 and the metal layer 136. Thus, as is the case with the two-layer structure, the photons in the dielectric cannot be coupled to the surface plasmons localized at the metal interface, located adjacent to the dielectric.

On the other hand, the dispersion curve 139 for the photons in the low-refractive-index dielectric always has a higher frequency than the dispersion curve 141 for the photons in the high-refractive-index dielectric. The dispersion curve 140 for the surface plasmons localized at the interface between the low-refractive-index dielectric layer and the metal layer always has a higher frequency than the dispersion curve 142 for the surface plasmons localized at the interface between the high-refractive-index dielectric layer and the metal layer. Thus, as shown in FIG. 15(B), the dispersion curve 141 for the photons in the high-refractive-index dielectric always has an intersecting point with the dispersion curve 140 for the surface plasmons localized at the interface between the low-refractive-index dielectric layer and the metal layer. That is, for the three-layer structure, the photons in the high-refractive-index dielectric can be coupled to the surface plasmons localized at the interface between the low-refractive-index dielectric layer and the metal layer.

The waveguide 112, metal electrode 118A, and photoelectric material 120 in the surface plasmon wave modulator 110, shown in FIG. 13, correspond to the high-refractive-index dielectric layer 135, metal layer 136, and low-refractive-index dielectric layer 134 in the three-layer structure, shown in FIG. 15(A). In the surface plasmon wave modulator 110, since the photoelectric material 120 has a smaller refractive index than the waveguide 112, the photons in the waveguide 112 can be coupled to the surface plasmons localized at the interface between the photoelectric material 120 and the metal electrode 118A.

However, in the surface plasmon wave modulator 110, if the photoelectric material 120 has a greater refractive index than the waveguide 112, a dispersion curve for photons in the waveguide 112 corresponds to the dispersion curve 139 for the photons in the low-refractive-index dielectric, shown in FIG. 15(B). A dispersion curve for surface plasmons localized at the interface between the metal electrode 118A and the buffer layer 116 and a dispersion curve for surface plasmons localized at the interface between the metal electrode 118A and the photoelectric material 120 correspond respectively to the dispersion curve 140 for the surface plasmons localized at the interface between the low-refractive-index dielectric layer and the metal layer and the dispersion curve 142 for the surface plasmons localized at the interface between the high-refractive-index dielectric layer and the metal layer, shown in FIG. 15(B). These dispersion curves have no intersecting point. That is, in this case, light advancing through the waveguide 112 cannot be coupled to the surface plasmons on any surface of the metal electrode 118A.

Therefore, the configuration of the surface plasmon wave modulator 110 in Japanese Patent Laid-Open No. 5-313108 needs to use a material having a smaller refractive index than the waveguide 112 as the photoelectric material 120.

On the other hand, a material having a greater electrooptical constant enables a reduction in voltage applied in order to vary the refractive index, facilitating control. This also enables a reduction in the size of a driving power source, allowing miniaturization and an increase in modulation speed.

However, materials having greater electrooptical constants generally have greater refractive indices than glass and resin. Thus, with the configuration of the surface plasmon wave modulator 110 in Japanese Patent Laid-Open No. 5-313108, materials having greater electrooptical constants have not been able to be used as a dielectric layer (photoelectric layer 120).

SUMMARY OF THE INVENTION

The present invention solves these problems. An object of the present invention is to provide an optical modulator and an optical modulation method which allow surface plasmons to resonate with propagation light without relying on the refractive index of a material located in proximity to a metal film.

The first aspect of the present invention is an optical modulator comprising:
a waveguide on which propagation light is incident;
a metal layer located adjacent to the waveguide and having a periodic structure which periodically extends along at least in a propagation direction of the waveguide; and
a dielectric layer located adjacent to a surface of the metal layer which is opposite a surface to which the waveguide is adjacent, the dielectric layer having an electrooptical effect.

The second aspect of the present invention is the optical modulator according to the first aspect of the present invention, wherein a period of the periodic structure is a two-dimensional period along the propagation direction which is at least 0.1 times and at most 1.5 times as large as the wavelength of the propagation light.

The third aspect of the present invention is the optical modulator according to the first aspect of the present invention, wherein the propagation light incident on the waveguide is linearly polarized light.

The fourth aspect of the present invention is the optical modulator according to the first aspect of the present invention, further comprising an electrode located via the dielectric layer and opposite the metal layer.

The fifth aspect of the present invention is the optical modulator according to the first aspect of the present invention, wherein the propagation light is wavelength multiplexed light that propagates at a plurality of wavelengths.

The sixth aspect of the present invention is the optical modulator according to the first aspect of the present invention, wherein the waveguide is a multimode waveguide that enables multimode propagation in at least one direction perpendicular to the propagation direction.

The seventh aspect of the present invention is the optical modulator according to claim 6, wherein the multimode waveguide has a maximum refractive index portion and a refractive index distribution portion in a direction perpendicular to the propagation direction, the refractive index distribution portion having a refractive index decreasing monotonously depending on a distance from the maximum refraction portion.

The eighth aspect of the present invention is the optical modulator according to the seventh aspect of the present invention, wherein in the refractive index distribution portion, the refractive index varies symmetrically with respect to a center of the maximum refractive index portion and substantially parabolically depending on a distance from the center, and the product of an optical length and a square root of a focusing parameter is substantially an integral multiple of π/2.

The ninth aspect of the present invention is the optical modulator according to the seventh aspect of the present invention, wherein the multimode waveguide is made of a polysilane-containing resin.

The tenth aspect of the present invention is the optical modulator according to the sixth aspect of the present invention, wherein the multimode waveguide has a predetermined uniform refractive index, and at least one of the number of input sections on an input surface and the number of output sections on an output surface varies depending on a waveguide width in a multimode direction and a propagation length.

The eleventh aspect of the present invention is the optical modulator according to the sixth aspect of the present invention, further comprising a beam converting section on an input side of the multimode waveguide to reduce the beam size of the propagation light.

The twelfth aspect of the present invention is the optical modulator according to the eleventh aspect of the present invention, wherein the propagation light having the beam size reduced by the beam converting section is incident on a position located away from a center of the multimode waveguide.

The thirteenth aspect of the present invention is the optical modulator according to the eleventh aspect of the present invention, wherein the propagation light having the beam size reduced by the beam converting section is incident on the multimode waveguide at an angle different from that of an optical axis of the multimode waveguide.

The fourteenth aspect of the present invention is an optical modulation method comprising the steps of:

providing an optical modulator having i) a waveguide on which propagation light is incident, ii) a metal layer located adjacent to the waveguide and having a periodic structure which periodically extends along at least in a propagation direction of the waveguide, and iii) a dielectric layer located adjacent to a surface of the metal layer which is opposite a surface to which the waveguide is adjacent, the dielectric layer having an electrooptical effect; and varying an electric field applied to the dielectric layer to vary the refractive index of the dielectric layer and thus a light quantity of the propagation light.

The present invention can provide an optical modulator and an optical modulation method which allow surface plasmons to resonate with propagation light without relying on the refractive index of a material located in proximity to a metal film.

BRIEF DESCRIPTION OF THE DRAWINGS

FIG. 1(A) is a schematic side sectional view showing the configuration of a mode coupling optical modulator in accordance with Embodiment 1 of the present invention, and FIG. 1(B) is a schematic diagram of the dispersion property of the mode coupling optical modulator in accordance with Embodiment 1 of the present invention;

FIG. 3 is a schematic side sectional view showing the configuration of the mode coupling optical modulator in accordance with Embodiment 1 of the present invention the configuration of which is different from those shown in the above figures;

FIG. 4(A) is perspective view with cross section showing an example of a periodic structure in a two-dimensional periodic metal layer in the mode coupling optical modulator in accordance with Embodiment 1 of the present invention;

FIG. 4(B) is perspective view with cross section showing an example of a periodic structure in a two-dimensional periodic metal layer in the mode coupling optical modulator in accordance with Embodiment 1 of the present invention;

FIG. 5(A) is a schematic side sectional view showing the configuration of a mode coupling optical modulator in accordance with Embodiment 2 of the present invention, and FIG. 5(B) is a schematic diagram of the dispersion property of the mode coupling optical modulator in accordance with Embodiment 2 of the present invention;

FIG. 10(A) is a schematic perspective view showing a configuration using a channel waveguide as an example of the mode coupling optical modulator in accordance with Embodiment 6 of the present invention, and FIG. 10(B) is a sectional view of the configuration example in FIG. 10(A);

FIG. 15(A) is a schematic sectional view showing that light is incident on a three-layer structure including a low-refractive-index dielectric layer, a metal layer, and a high-refractive-index dielectric layer, and FIG. 15(B) is a diagram showing the dispersion property of photons and surface plasmons in the dielectric layers in the three-layer structure including the low-refractive-index dielectric layer, the metal layer, and the high-refractive-index dielectric layer.

Figure 2:
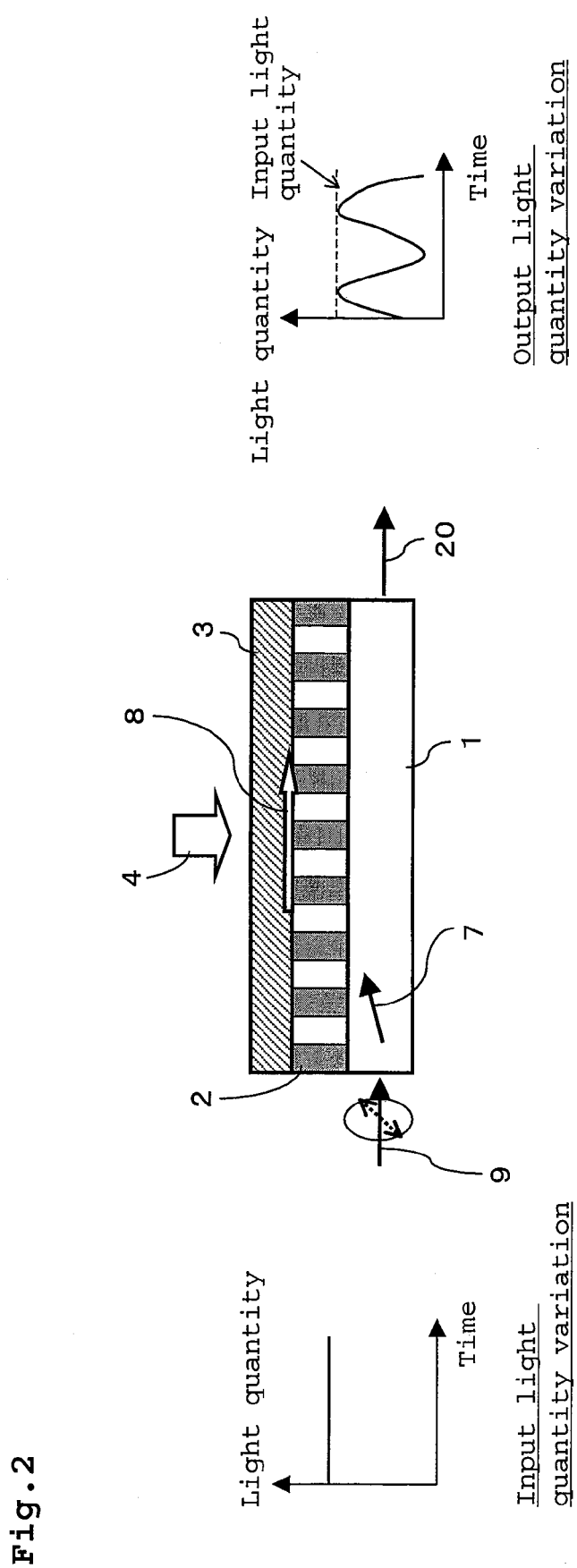
FIG. 2 is a schematic side sectional view of the mode coupling optical modulator in accordance with Embodiment 1 of the present invention which is configured to use linearly polarized light as input light.

DESCRIPTION OF SYMBOLS 1, 21, 112, 201 Waveguides
2, 25, 29 Two-dimensional periodic metal layer
3, 26, 30 Electrooptical material layer
3' LiNbO$_3$ crystal
4 External modulating electric field
5 Input light
6, 20, 27, 31, 33 Output light
23 Output light (ω1 to ωn)
7, 22, 24 Resonance mode
8, 28, 32 Surface plasmon
9 Linearly polarized input light
10 Electrode
11 External modulating voltage
12 Wavelength multiplexed input light (ω1 to ωn)
13 Beam converting section
14 Y bifurcated waveguide
15 Clad
16 Multimode interference (MMI) waveguide
35 Multimode (MM) waveguide
17 Waveguide width
18 Optical path length
19 Refractive index distribution (GI) waveguide
40, 46, 48 Dispersion curves for waveguide modes of photons
41, 44, 47, 49 Dispersion curves for resonance modes of photons
42 Dispersion curve for surface plasmons localized at interface between metal and electrooptical material layer
43, 50 Resonance points
45 Resonance zone
61 Range of multiplexed light frequency
71 Possible excitation range
202, 303 Core
301 Optical fiber (core)
302 Optical fiber
304 Ground surface
401 Orientation of LiNbO$_3$ crystal
402 Orientation of LiNbO$_3$ crystal
110 Surface plasmon wave modulator
114 Coating material
116 Buffer layer
118A, 118B Metal electrode
120 Photoelectric material
130 Dielectric layer
131, 136 Metal layer
132 Dispersion curve for photons in dielectric
133 Dispersion curve for surface plasmons
134 Low-refractive-index dielectric layer
135 High-refractive-index dielectric layer
137 Surface plasmons at interface between low-reactive-index layer and metal layer
138 Surface plasmons at interface between high-refractive-index layer and metal layer
139 Dispersion curve for photons in low-refractive-index dielectric
140 Dispersion curve for surface plasmons at interface between low-refractive-index dielectric layer and metal layer
141 Dispersion curve for photons in high-refractive-index dielectric
142 Dispersion curve for surface plasmons at interface between high-refractive-index dielectric layer and metal layer

PREFERRED EMBODIMENTS OF THE INVENTION

Embodiments of the present invention will be described below with reference to the drawings.

Embodiment 1

FIG. 1(A) is a schematic side sectional view showing the configuration of a mode coupling optical modulator in accordance with Embodiment 1 of the present invention. FIG. 1(B) is a schematic diagram of the dispersion properties of the mode coupling optical modulator.

As shown in FIG. 1(A), the mode coupling optical modulator in accordance with Embodiment 1 is composed of a two-dimensional periodic metal layer 2, an electrooptical material layer 3 located adjacent to one surface of the two-dimensional periodic metal layer 2 to exert an electrooptical effect, and a waveguide 1 located adjacent to the other surface of the two-dimensional periodic metal layer 2.

The two-dimensional periodic metal layer 2 corresponds to an example of a metal layer having a periodic structure in a propagation direction of the waveguide in accordance with the present invention. The electrooptical material layer 3 corresponds to an example of a dielectric layer that exerts an electrooptical effect in accordance with the present invention.

The two-dimensional periodic metal layer 2 has a two-dimensional periodic structure which periodically extends along in a surface direction (the direction parallel to the surface of the metal layer 2). The period is about equal to the wavelength of propagation light Furthermore, the waveguide 1 has a resonance mode 7 in which the wavelength of input light 5 can be resonated with surface plasmons 8 localized at the interface between the two-dimensional periodic metal layer 2 and the electrooptical material layer 3. Further, the electrooptical material layer 3 is formed of an electrooptical material with a great refractive index such as LiNbO$_3$ or KTP. An external modulating electric field 4 is applied to the electrooptical material layer 3. The two-dimensional periodic metal layer 2 is formed of a material such as gold or silver which is commonly used as a metal layer in an optical modulator. A specific example of the periodic structure of the two-dimensional periodic metal layer 2 will be described below.

Figure 13:
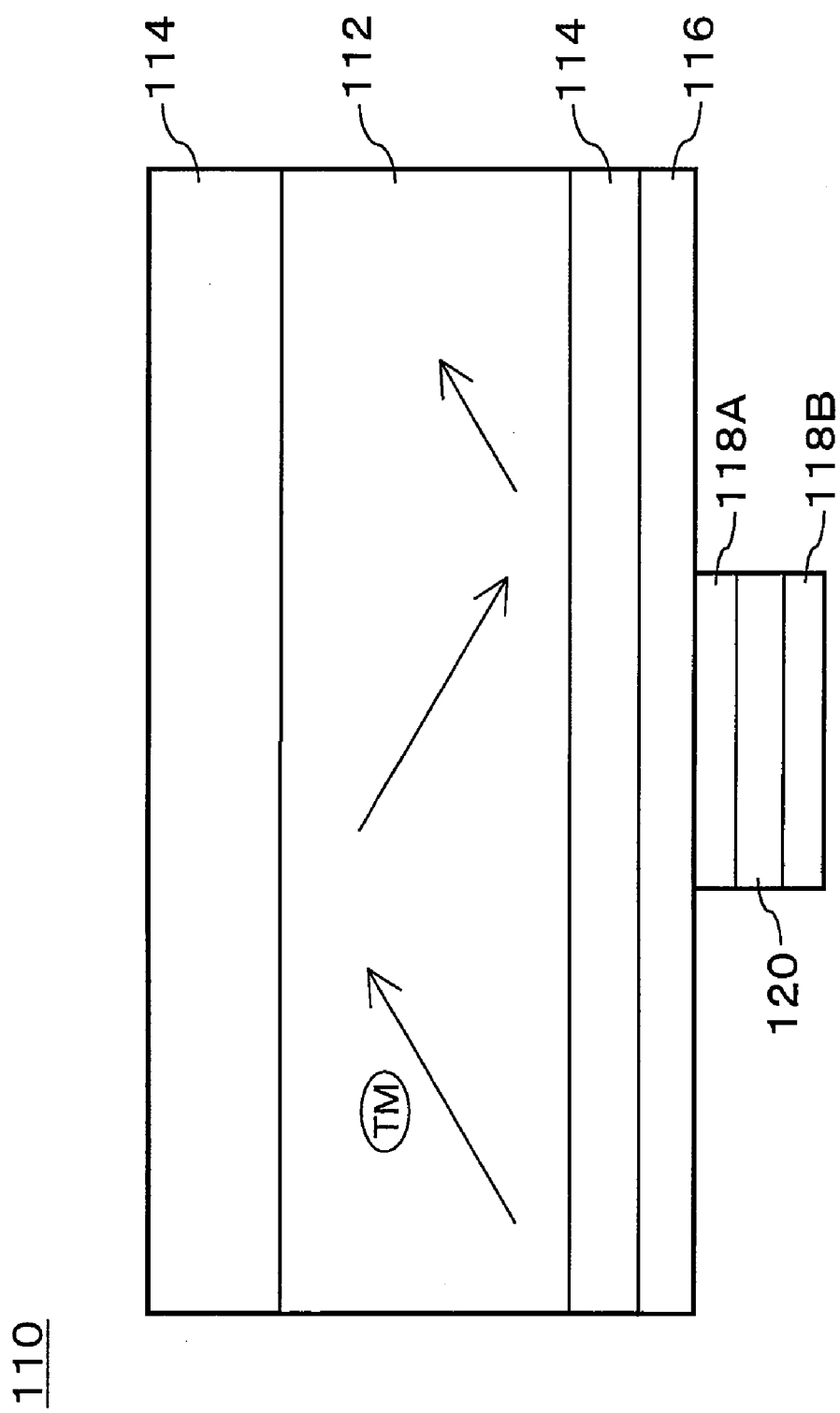
FIG. 13 is a side sectional view of a conventional surface plasmon wave modulator based on a mode coupling indirect modulation scheme.
Figure 14:
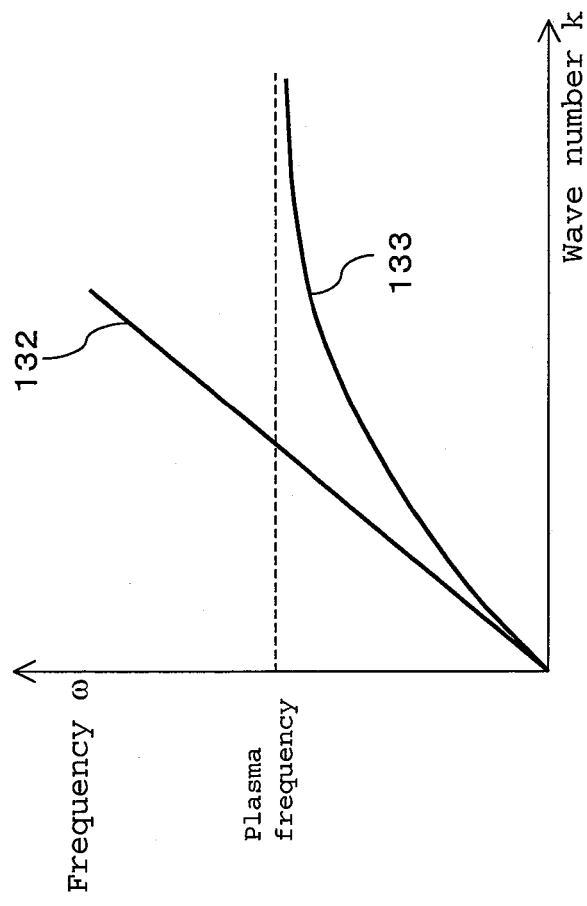
FIG. 14(A) is a schematic sectional view showing that light is incident on a two-layer structure including a dielectric layer and a metal layer.
FIG. 14(B) is a diagram showing the dispersion property of photons and surface plasmons in the dielectric layer in the two-layer structure including the dielectric layer and the metal layer.
Figure 14:
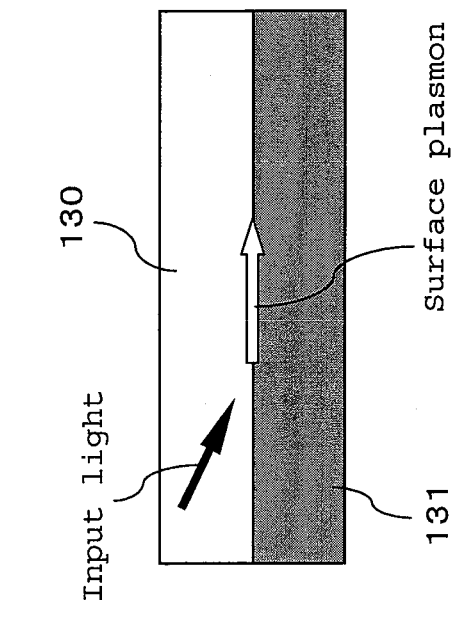

As described above with reference to FIGS. 14 and 15, for a three-layer structure including the dielectric layer, a metal layer, and another dielectric layer, it is necessary to provide the dielectric layer having a smaller refractive index than the dielectric through which the propagation light advances via a metal layer in order to resonate the propagation light in the dielectric with the surface plasmons. This is due to the use of a metal layer not having a periodic structure such as the flat metal electrode 118A in the surface plasmon wave modulator 110 in FIG. 13.

Thus, in a three-layer structure including the dielectric layer, a metal layer, and another dielectric layer such as the one shown in FIG. 15, a periodic structure with a period about equal to the wavelength is formed in the metal layer in the surface direction, for example, recesses and protrusions or holes are periodically arranged in the metal layer in the surface direction. Then, a dispersion curve for surface plasmons localized at the interface between the high-refractive-index dielectric layer and the metal layer can be expressed by a first Brillouin zone ($-\pi/a < k < \pi/a$, where a denotes the period of the periodic structure). In this case, a k>0-side (light propagating direction) dispersion curve 42 for surface plasmons includes a 0th-order dispersion curve 42a for a progressive wave indicating a positive correlation similar to that observed when the conventional flat metal layer is used and a 1st-order dispersion curve 42b for a regressive wave indicating a negative correlation, as shown in FIG. 1(B).

The inclination of a dispersion curve for the positive correlation in a low frequency area of the surface plasmons 8 localized at the interface between the electrooptical material layer 3 and the two-dimensional periodic metal layer 2 is in inverse proportion to the refractive index of the electrooptical material layer 3. A dispersion curve for the negative correlation in a high frequency area is determined in association with (depending on) the dispersion curve for the low frequency area.

On the other hand, for a dispersion curve 40 for a waveguide mode of photons in the waveguide 1, composed of the low-refractive-index material such as glass or resin, wave number and frequency exhibit a positive linear correlation in each waveguide mode as shown in FIG. 1(B). The inclination decreases consistently with the mode order. A straight line 40a and a curve 40b shown by the dispersion curve 40 for the waveguide mode of the photons show dispersion curves for waveguide modes with the maximum and minimum inclinations. Dispersion curves for other waveguide modes are present between the straight line 40a and curve 40b.

FIG. 1(B) shows that the dispersion curve 41 for photon resonance modes, contained in the dispersion curve 40 for the waveguide mode of the photons, can have the dispersion curve 42 for surface plasmons localized at the interface between the electrooptical material layer 3 and the two-dimensional periodic metal layer 2 and a resonance point 43 at a propagation optical frequency $\omega 0$. Here, the resonance point 43 is located between the dispersion curve 41 for a resonance mode of the photons and a primary dispersion curve for the regressive wave, contained in the dispersion curve 42 for the surface plasmons. Thus, the propagation light is coupled to the surface plasmons 8 traveling in a direction opposite to the progressive direction.

The direction of an arrow shown at the surface plasmons 8 in FIG. 1 shows the propagating direction of the surface plasmons. FIG. 1 shows only the "positive direction", which is the same as the direction of the propagation light. However, when the periodic structure is formed in the two-dimensional periodic metal layer 2 as described above, the surface plasmons 8 occur not only in the "positive direction" but also in a "negative direction", which is opposite to the direction of the propagation light. The surface plasmons 8 in the "negative direction" then couples with the propagation light.

However, the waveguide 1 needs to be designed so that the surface plasmons 8 and photons can be coupled together at a propagation light frequency ($\omega 0$ in a desired manner.

The surface plasmons 8 thus resonate with the propagation light to reduce the transmission amount of the waveguide mode (resonance mode 7) of the photons coupled to the surface plasmons 8. Thus, the transmission amount can be varied by applying an external electric field to the electrooptical material layer 3 to vary the refractive index, and varying the dispersion curve 42 for the surface plasmons in the vicinity of the resonance point 43. Consequently, as shown in FIG. 1(A), the light quality of output light 6 having passed through the waveguide 1 can be varied depending on the electric field intensity of the external modulating electric field 4.

Here, since the surface plasmons 8 are in a TM mode, the only resonance mode 7 of the photons which allows the transmission light quantity to be varied is the waveguide mode of a resonant TM wave. However, a generally required optical percentage modulation is at most 10%. Thus, a variation in light quantity required for the optical percentage modulation can be sufficiently achieved even when only the particular TM mode resonates.

FIG. 2 is a schematic side sectional view showing the configuration of the mode coupling optical modulator in accordance with Embodiment 1 that uses linearly polarized light as input light. The same components as those in FIG. 1(A) are denoted by the same reference numerals.

As shown in FIG. 2, when the propagation light in the waveguide 1 is limited only to linearly polarized input light 9, for example, the TM mode, the output light 20 increases in the percentage modulation in spite of a decrease in transmission light quantity. The percentage modulation can also be adjusted by regulating the ratio of the TM mode and a TE mode both propagating through the waveguide 1.

FIG. 3 is a schematic side sectional view showing the configuration of the mode coupling optical modulator in accordance with Embodiment 1 which configuration is different from that described above. The same components as those in FIG. 1(A) are denoted by the same reference numerals.

The optical modulator in FIG. 3 has an electrode 10 located opposite to the two-dimensional periodic metal layer 2 so as to sandwich the electrooptical material layer 3 between the electrode 10 and the two-dimensional periodic metal layer 2.

In the mode coupling optical modulator, the external modulating electric voltage 11 is applied to between the two-dimensional periodic metal layer 2 and the electrode 10 to vary the electric field applied to the electrooptical material layer 3. This varies the light quantity of propagation light.

With the configuration shown in FIG. 3, reducing the thickness of the electrooptical material layer 3 enables an increase in applied electric field and in percentage modulation.

Now, description will be given of specific examples (two-dimensional periodic metal layers 2a to 2f) of the periodic structure of the two-dimensional periodic metal layer 2.

Figure 4C:
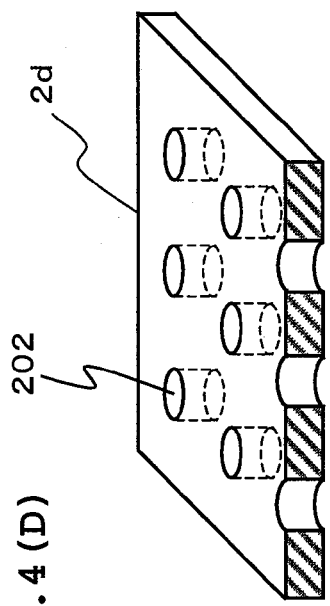
FIG. 4(C) is perspective view with cross section showing an example of a periodic structure in a two-dimensional periodic metal layer in the mode coupling optical modulator in accordance with Embodiment 1 of the present invention.

FIGS. 4(A) and 4(B) are perspective views and sectional views showing examples (two-dimensional periodic metal layers 2a and 2b) of the periodic structure of the two-dimensional periodic metal layer 2; the sectional views are taken along line A-A shown in the perspective views. FIGS. 4(C) to 4(F) are sectional perspective views of other examples (two-dimensional periodic metal layers 2c to 2f) of the periodic structure of the two-dimensional periodic metal layer 2. FIGS. 4(C) to 4(F) all show perspective views each including a cross section corresponding to the position A-A of FIGS. 4(A) and 4(B). These figures are all used to describe the periodic structures and show only a part of the corresponding periodic structure.

The periodic structure formed in the two-dimensional periodic metal layer 2 has only to be formed in a place where the periodic structure has an effect on surface plasmons to be coupled to propagation light. Thus, the periodic structure may be formed all over the surface of the two-dimensional periodic metal layer 2 or only in a part of the surface provided that the periodic structure has an effect on the surface plasmons.

FIG. 4(A) shows an example in which protrusions are periodically formed on the surface of the two-dimensional periodic metal layer 2. FIG. 4(B) shows an example in which holes are periodically formed on the surface of the two-dimensional periodic metal layer 2.

FIGS. 4(A) and 4(B) both show examples in which the periodic structure is shaped like a tetragonal lattice. However, other periodic structures may be used. However, since higher symmetry exerts a more significant effect on the surface plasmons, the periodic structure is desirably formed like an equilateral triangular lattice or a tetragonal lattice.

Figure 4D:
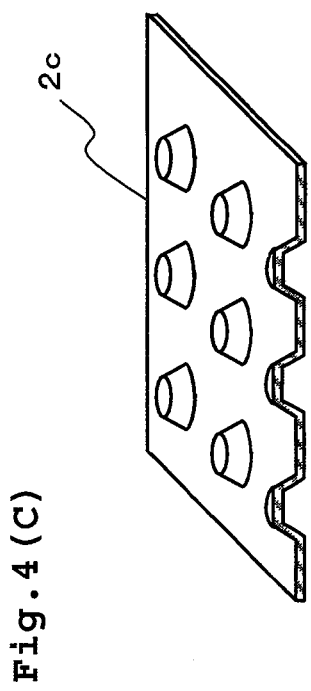
FIG. 4(D) is perspective view with cross section showing an example of a periodic structure in a two-dimensional periodic metal layer in the mode coupling optical modulator in accordance with Embodiment 1 of the present invention.
Figure 4E:
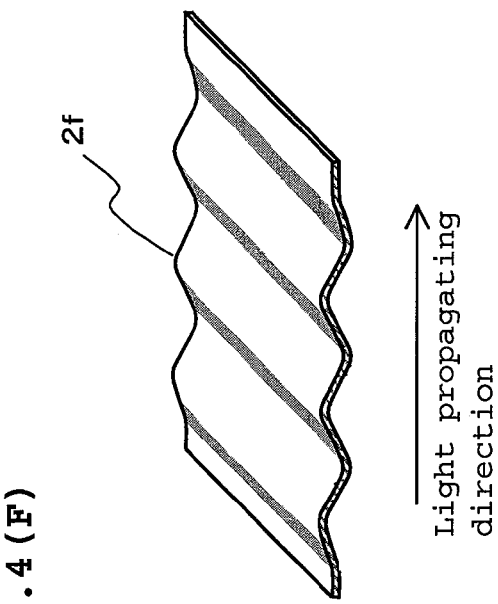
FIG. 4(E) is perspective view with cross section showing an example of a periodic structure in a two-dimensional periodic metal layer in the mode coupling optical modulator in accordance with Embodiment 1 of the present invention.

When the two-dimensional periodic metal layer 2 is thin, the periodic structure may be formed so that, for example, recesses and corresponding protrusions are formed on the respective surfaces of the metal layer 2 as shown in FIG. 4(C). Furthermore, FIG. 4(B) shows a two-dimensional periodic metal layer 2b having holes 201 each having a bottom portion. However, the present invention is not limited to this, but a two-dimensional periodic metal layer 2d having through-holes 202 may be provided as shown in FIG. 4(D). Alternatively, as shown in FIG. 4(E), cavities 203 may be periodically formed inside a two-dimensional periodic metal layer 2e.

Figure 4F:
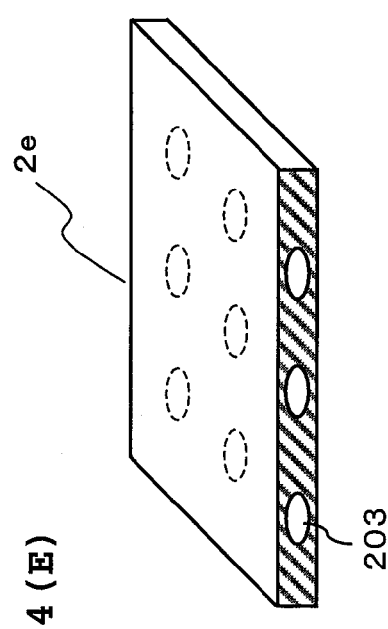
FIG. 4(F) is perspective view with cross section showing an example of a periodic structure in a two-dimensional periodic metal layer in the mode coupling optical modulator in accordance with Embodiment 1 of the present invention.

Furthermore, the present invention is not limited to the two-dimensional periodic structure formed in the surface direction. A one-dimensional periodic structure may be provided as long as the structure is periodic in the light propagation direction. For example, the periodic structure may be shaped to be periodic only in the light propagation direction as shown in FIG. 4(F).

Furthermore, the periodic structure formed in the two-dimensional periodic metal layer 2 may be formed on either surface of the metal layer 2 or may of course be formed on both surfaces as long as the periodic structure has an effect on surface plasmons to be coupled to propagating light. Alternatively, the periodic structure may be formed inside the metal layer 2 as shown in FIG. 4(E).

In FIG. 1(B), the primary dispersion curve for the surface plasmons, that is, $0.5 < a/\lambda < 1.0$ (where $\lambda$ denotes the wavelength of light) can be coupled to the propagation light. However, a secondary dispersion curve can also be coupled to the propagation light, with a resultant decrease in sensitivity. Consequently, $0.5 < a/\lambda < 1.5$ may also be used. Furthermore, if the electrooptical material has a smaller refractive index than the waveguide, a 0th-order dispersion curve, that is, $a/\lambda < 0.5$ may also be used.

Therefore, the period a of the above periodic structure desirably meets the condition $0.1 < a/\lambda < 1.5$. In other words, the "period about equal to the wavelength of the propagation light" described herein refers to a period of a length appropriate to have an effect on the surface plasmons to be coupled to the propagation light. The period is desirably about 0.1 to 1.5 times as long as the wavelength of the propagation light.

The dispersion curve for the surface plasmons varies depending on the shape of the periodic structure. The dispersion curve also varies depending on the material and thickness of the two-dimensional periodic metal layer 2. A combination of these conditions enables the surface plasmons to be coupled to the desired wavelength of the propagation light.

As described above, in the mode coupling optical modulator in accordance with the present embodiment 1, the metal layer between the waveguide 1 and the electrooptical material layer 3 is the two-dimensional periodic metal layer 2 having the periodic structure with a period that is about equal to the wavelength. Thus, as the electrooptical material layer 3, it is possible to use a high dielectric having a high electrooptical constant, such as $LiNbO_3$ or KTP, which has a greater refractive index than glass and resin, commonly used as waveguide materials. This is because the present embodiment can excite a high order mode of the surface plasmons 8 localized at the interface between the electrooptical material layer 3 and the two-dimensional periodic metal layer 2, which mode can resonate with the propagation mode in the waveguide 1. That is, the present embodiment enables the electrooptical material optimum for optical modulation to be selected as the electrooptical material layer 3.

Furthermore, the configuration of the conventional mode coupling optical modulator requires that the core itself be a high dielectric having a high electrooptical constant, such as $LiNbO_3$ or KTP, which has a high refractive index. The configuration of the conventional mode coupling optical modulator further requires that light be passed directly through the high dielectric. However, the optical modulator in accordance with Embodiment 1 eliminates the need to pass light directly through the high dielectric. This in turn eliminates the need to use an optical grade material, enabling a reduction in costs.

Embodiment 2

FIG. 5(A) is a schematic side sectional view showing a mode coupling optical modulator in accordance with Embodiment 2 of the present invention. FIG. 5(B) shows a schematic diagram of the dispersion properties of the mode coupling optical modulation. The same components as those in FIG. 1 are denoted by the same reference numerals.

The mode coupling optical modulator in accordance with Embodiment 2 is used for wavelength multiplexed transmission. Propagation light in a waveguide 21 has a plurality of wavelengths. Wavelength multiplexed input light 12 having a plurality of wavelengths ($\omega 1$ to $\omega n$) is input to output output light 23 having the plurality of wavelengths ($\omega 1$ to $\omega n$).

With the wavelength multiplexed transmission, a resonance mode 22 varies depending on the wavelength. As shown in FIG. 5(B), the dispersion curve 40 for a waveguide mode of photons includes a plurality of dispersion curves 44 for resonance modes of the photons. The dispersion curves 44 for the resonance modes of the photons have intersecting points at a plurality of positions on a resonance zone 45 that is a frequency range 61 for multiplexed light. That is, in this case, the photons and the surface plasmons have a plurality of resonance points for the plurality of wavelengths (frequencies).

However, the resonance between the photons and the surface plasmons cannot be achieved for all the wavelengths. Thus, the wavelength matching the resonance point has a high percentage modulation. The percentage modulation decreases with increasing distance from the resonance point. This results in a variation in percentage modulation in a multiplexed light space. The variation can be improved by increasing the sectional size of the waveguide 21 and thus the number of natural modes to allow the natural modes to be consecutively generated (multimode), or increasing the refractive index at the design stage.

Embodiment 3

Figure 6A:
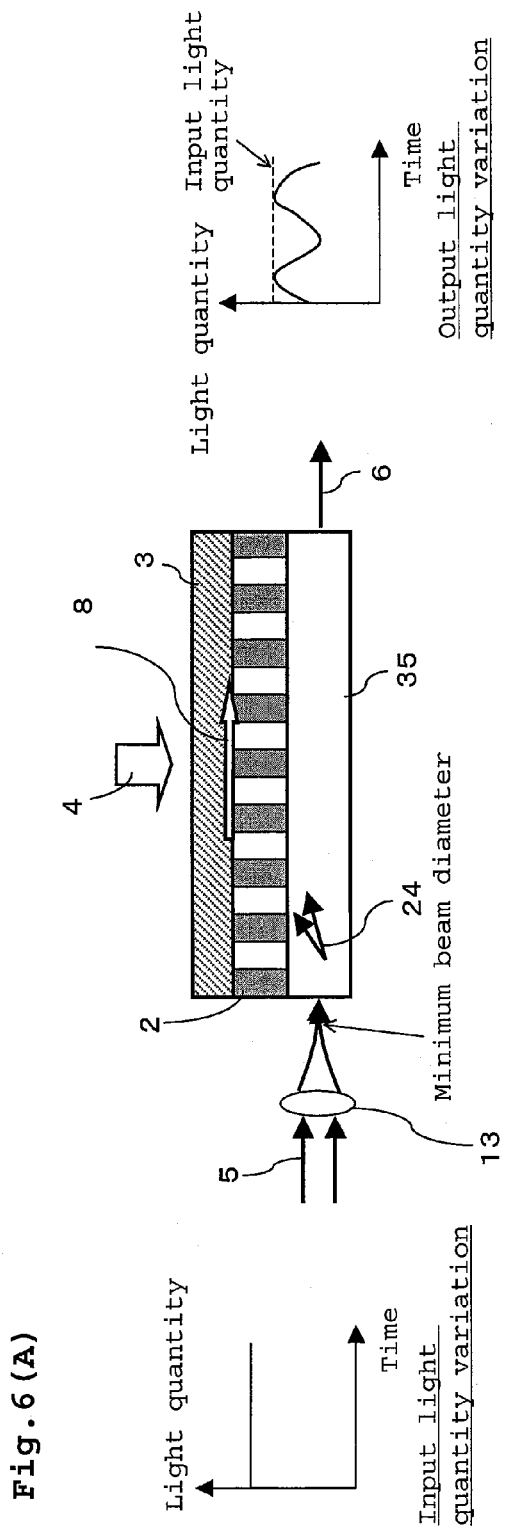
FIG. 6(A) is a schematic side sectional view showing the configuration of a mode coupling optical modulator in accordance with Embodiment 3 of the present invention.
Figure 6B:
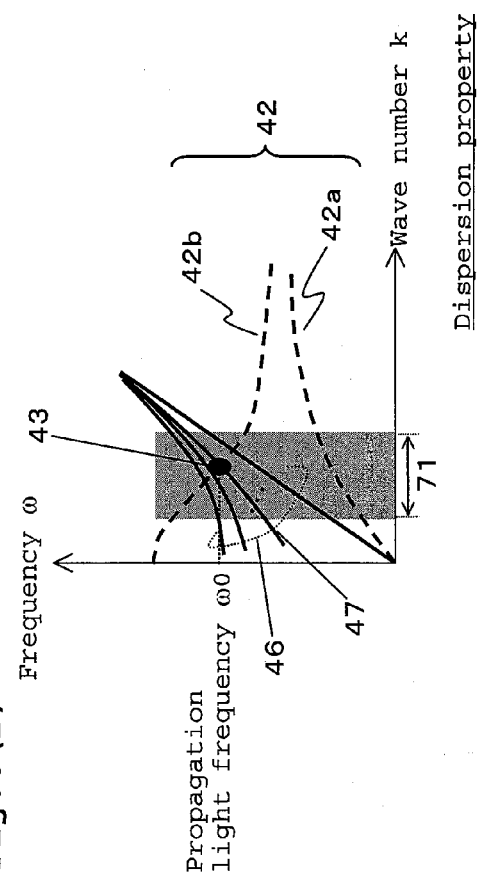
FIG. 6(B) is a schematic diagram of the dispersion property of the mode coupling optical modulator in accordance with Embodiment 3 of the present invention.

FIG. 6(A) is a schematic side sectional view showing the configuration of a mode coupling optical modulator in accordance with Embodiment 3 of the present invention. FIG. 6(B) shows a schematic diagram of the dispersion properties of the mode coupling optical modulation. The same components as those in FIG. 1 are denoted by the same reference numerals.

A waveguide in the mode coupling optical modulator in accordance with Embodiment 3 is a multimode (MM) waveguide 35 through which a plurality of natural modes propagate. The MM waveguide 35 comprises a beam converting section 13 at an incident side thereof. The other arrangements are similar to those of the mode coupling optical modulator in accordance with Embodiment 1, shown in FIG. 1.

The MM waveguide 35 has a plurality of waveguide modes having different directions for the respective natural modes. Thus, as shown in FIG. 6(B), a plurality of dispersion curves 46 for waveguide modes of photons include one dispersion curve 47 for a resonance mode of the photons having, at a propagation light frequency $\omega 0$, an intersecting point with a primary dispersion curve 42b for a regressive wave of surface plasmons. The "multimode direction" corresponds to, for example, the direction perpendicular to the propagation direction.

Exciting all the natural modes in the MM waveguide 35 of a finite length within an excitable range 71 allows the natural modes to be consecutively obtained on the wave number axis (on a k space). Thus, the mode coupling optical modulator in accordance with Embodiment 3 uses the beam modulating section 13 to minimize the beam diameter of the input light 5 input to the MM waveguide 35 with respect to the cross section of the MM waveguide 35. This increases the number of spatial frequencies to excite all the natural modes.

Using the beam converting section to minimize the input light is very effective for a configuration that propagates wavelength multiplexed light as is the case with Embodiment 2, shown in FIG. 5. Thus, such a configuration desirably has the beam converting section.

The all natural mode excitation may pose a mode dispersion problem. A significant group velocity variance may occur between the 0-th order mode and the high order modes. Thus, the mode dispersion problem can be alleviated by reducing only the low order modes such as the 0-th order mode.

Only the low order modes such as the 0-th order mode can be reduced by allowing a beam constricted by the beam converting section 13 to enter the MM waveguide 35 from a position deviating from the optical axis or at an angle different from that of the optical axis.

Embodiment 4

Figure 7:
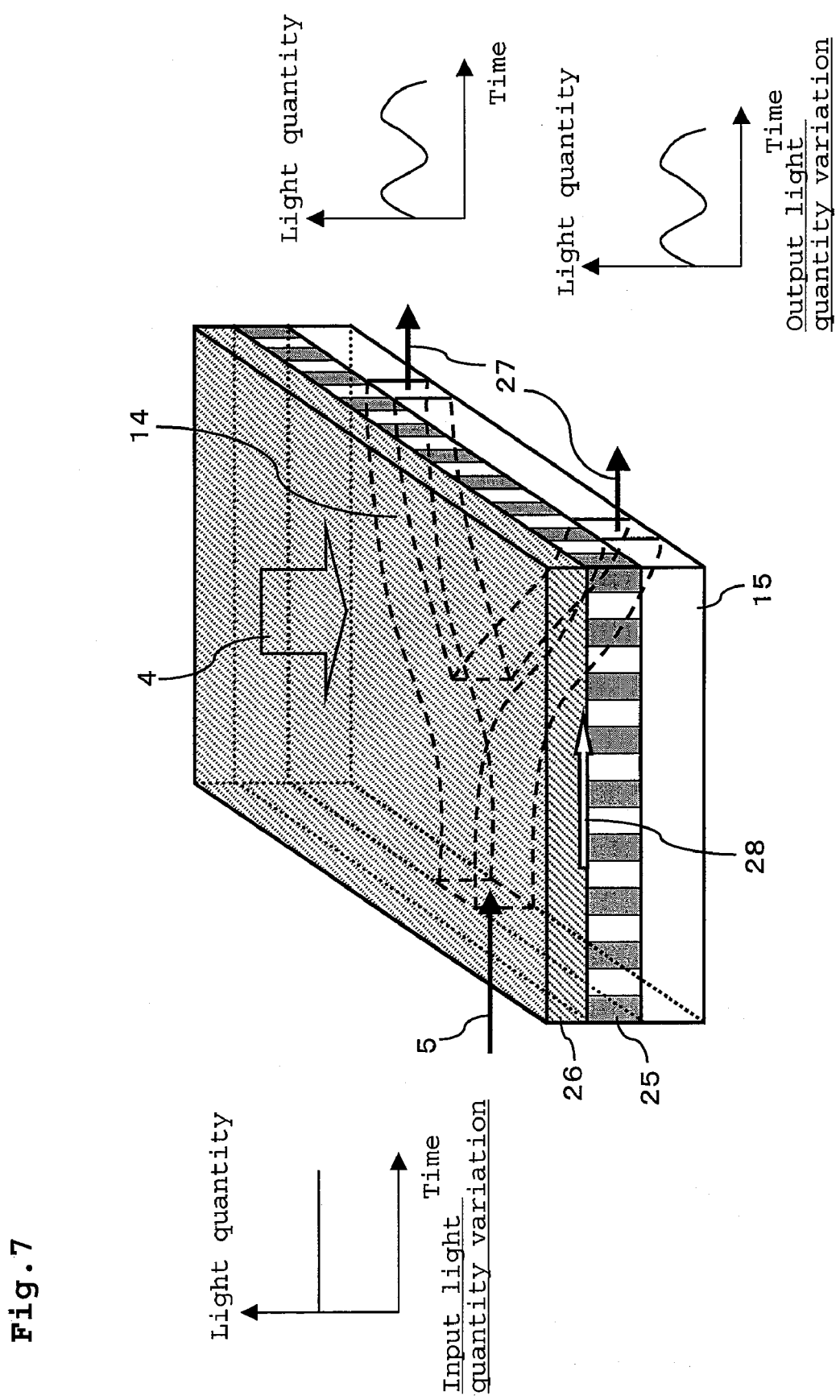
FIG. 7 is a perspective view showing the configuration of a mode coupling optical modulator in accordance with Embodiment 4 of the present invention.

FIG. 7 is a perspective view showing the configuration of a mode coupling optical modulator in accordance with Embodiment 4 of the present invention. The same components as those in FIG. 1 are denoted by the same reference numerals.

A side sectional view of the mode coupling optical modulator in accordance with Embodiment 4 is similar to FIG. 1(A). However, as shown in FIG. 7, the mode coupling optical modulator in accordance with Embodiment 4 has a Y bifurcated waveguide 14 enclosed by a clad 15 instead of the layer of the waveguide 1, shown in FIG. 1(A).

As shown in FIG. 7, an electrooptical material layer 26 having an electrooptical effect is located adjacent to one surface of the two-dimensional periodic metal layer 25. A Y bifurcated waveguide 14 and a clad 15 are arranged adjacent to the other surface of the two-dimensional periodic metal layer 25.

As is the case with the optical modulator in accordance with Embodiment 1, the Y bifurcated waveguide 14 is formed of a low-refractive-index material such as glass or resin, and the electrooptical material layer 26 is formed of a high-refractive-index electrooptical material such as $LiNbO_3$ or KTP.

The input light 5 having entered the Y bifurcated waveguide 14 is coupled to surface plasmons 28 localized at the interface between the electrooptical material layer 26 and the two-dimensional periodic metal layer 25. The input light has the transmission quantity thereof varied according to a variation in external modulating electric field 4 and is bifurcated into two beams. Consequently, output light 27 subject to light quantity modulation is output from two output sections of the Y bifurcated waveguide 14.

When the Y bifurcated waveguide 14 as shown in FIG. 7 is used, the two-dimensional periodic metal layer 25 and the electrooptical material layer 26, located in proximity to each other, may also be Y shaped like the Y bifurcated waveguide 14. However, this requires a step of processing the two-dimensional periodic metal layer 25 and the electrooptical material layer 26 so that the layers are shaped like the Y bifurcated waveguide 14. Thus, Embodiment 4 adopts the simple rectangular shape including the clad 15, enclosing the Y bifurcated waveguide 14 as shown in FIG. 7.

The two-dimensional periodic metal layer 25 and the electrooptical material layer 26 may have different shapes provided that each of the layers 25 and 26 includes a portion for the Y bifurcated waveguide 14.

Thus, modulating the propagation light in the Y bifurcated waveguide 14 makes it possible to simultaneously provide a bifurcating function and a modulating function.

Even if a waveguide configured as shown in FIG. 7 but having any shape different from the Y bifurcation is used instead of the Y bifurcated waveguide 14, the waveguide may provide not only the functions inherent in the waveguide but also the modulating function.

Embodiment 5

Figure 8:
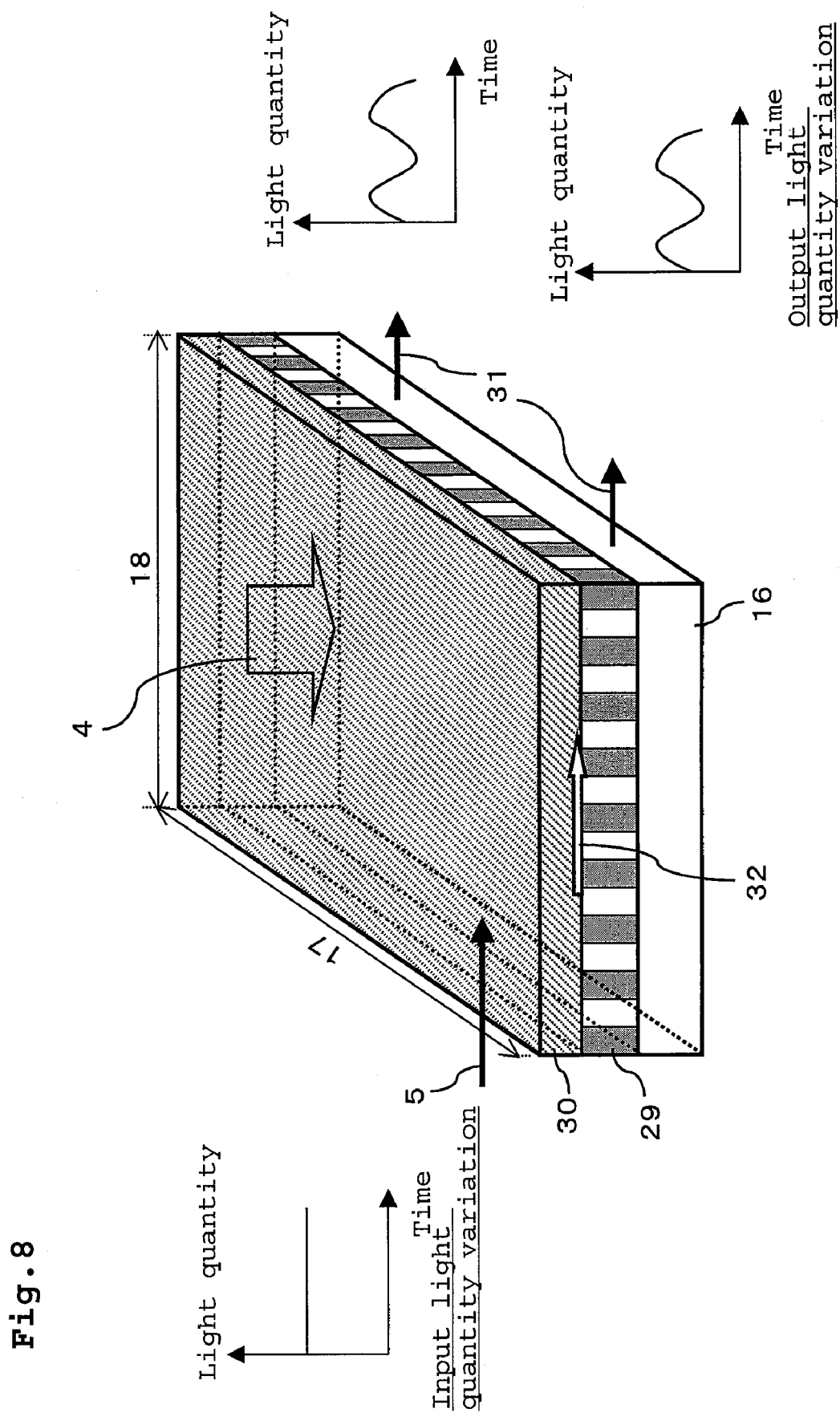
FIG. 8 is a perspective view showing the configuration of a mode coupling optical modulator in accordance with Embodiment 5 of the present invention.

FIG. 8 is a perspective view showing the configuration of a mode coupling optical modulator in accordance with Embodiment 5 of the present invention. The same components as those in FIG. 1 are denoted by the same reference numerals.

A side sectional view of the mode coupling optical modulator in accordance with Embodiment 5 is similar to FIG. 1(A). However, as shown in FIG. 8, the mode coupling optical modulator in accordance with Embodiment 5 has a multimode interference (MMI) waveguide 16 that can control the distribution of output beams in a width direction, instead of the layer of the waveguide 1, shown in FIG. 1(A).

As shown in FIG. 8, an electrooptical material layer 30 having an electrooptical effect is located adjacent to one surface of a two-dimensional periodic metal layer 29. The MMI waveguide 16 is located adjacent to the other surface of the two-dimensional periodic metal layer 29.

The MMI waveguide 16 has a uniform predetermined refractive index as well as a waveguide width 17 and an optical path length 18 which have a particular relationship. The MMI waveguide 16 controls the output beam distribution in the width direction so that the input light 5 can be bifurcated into two beams to output output light 31.

The input light 5 having entered the MMI waveguide 16 is coupled to surface plasmons 32 localized at the interface between the electrooptical material layer 30 and the two-dimensional periodic metal layer 29. The input light thus has the transmission quantity thereof varied according to a variation in external modulating electric field 4. After having the light quantity modulated and being bifurcated into two beams, the output light 31 is output from an output section of the MMI waveguide 16.

Thus, modulating the propagation light in the MMI waveguide 16, having the bifurcating function, makes it possible to simultaneously provide the bifurcating function and the modulating function.

The multimode interference makes it possible to implement not only the bifurcation but also various other functions such as demultiplication and spatial multiplex transmission. Thus, when the MMI waveguide is configured as shown in FIG. 8 but so as to provide any functions different from those of the MMI waveguide 16, this MMI waveguide can be adapted to provide the modulating function as well as the above functions. Therefore, it is possible to simplify the optical circuit having respective functions.

Embodiment 6

Figure 9:
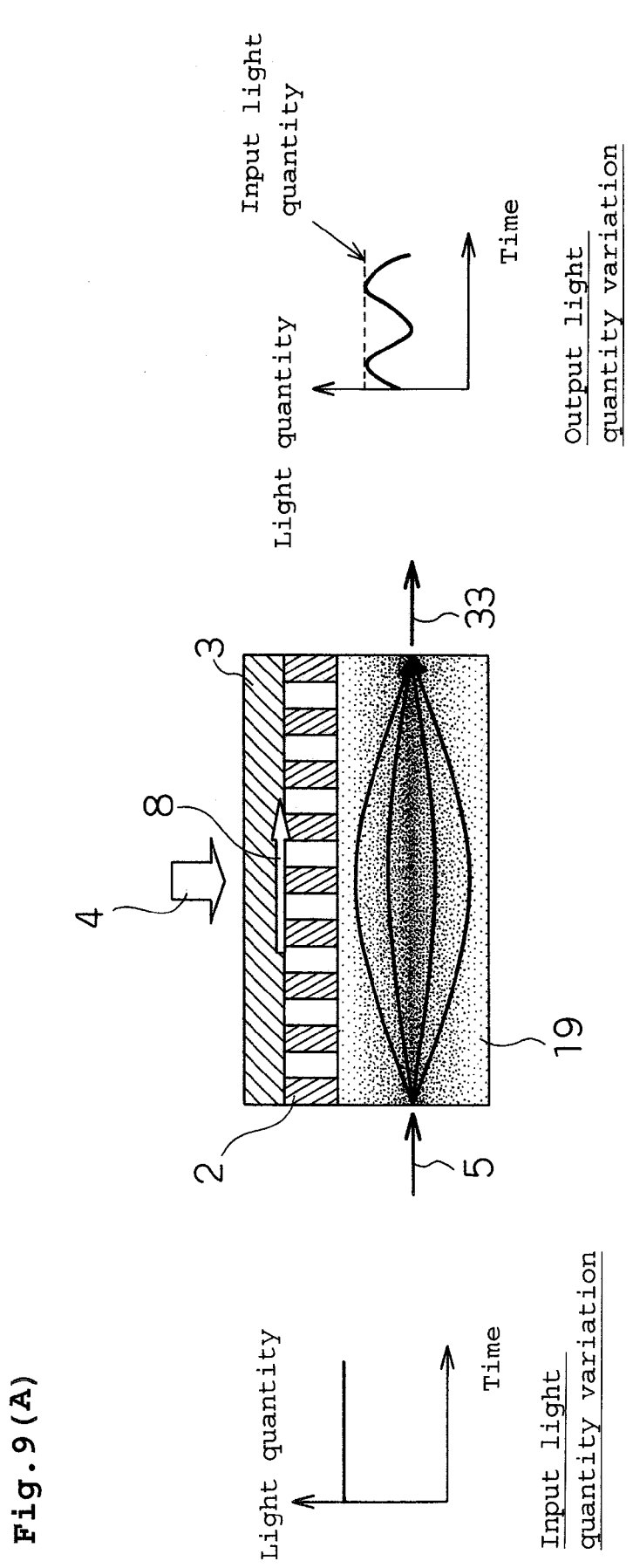
FIG. 9(A) is a schematic side sectional view showing the configuration of a mode coupling optical modulator in accordance with Embodiment 6 of the present invention.
FIG. 9(B) is a schematic diagram of the dispersion property of the mode coupling optical modulator in accordance with Embodiment 6 of the present invention.
Figure 9B:
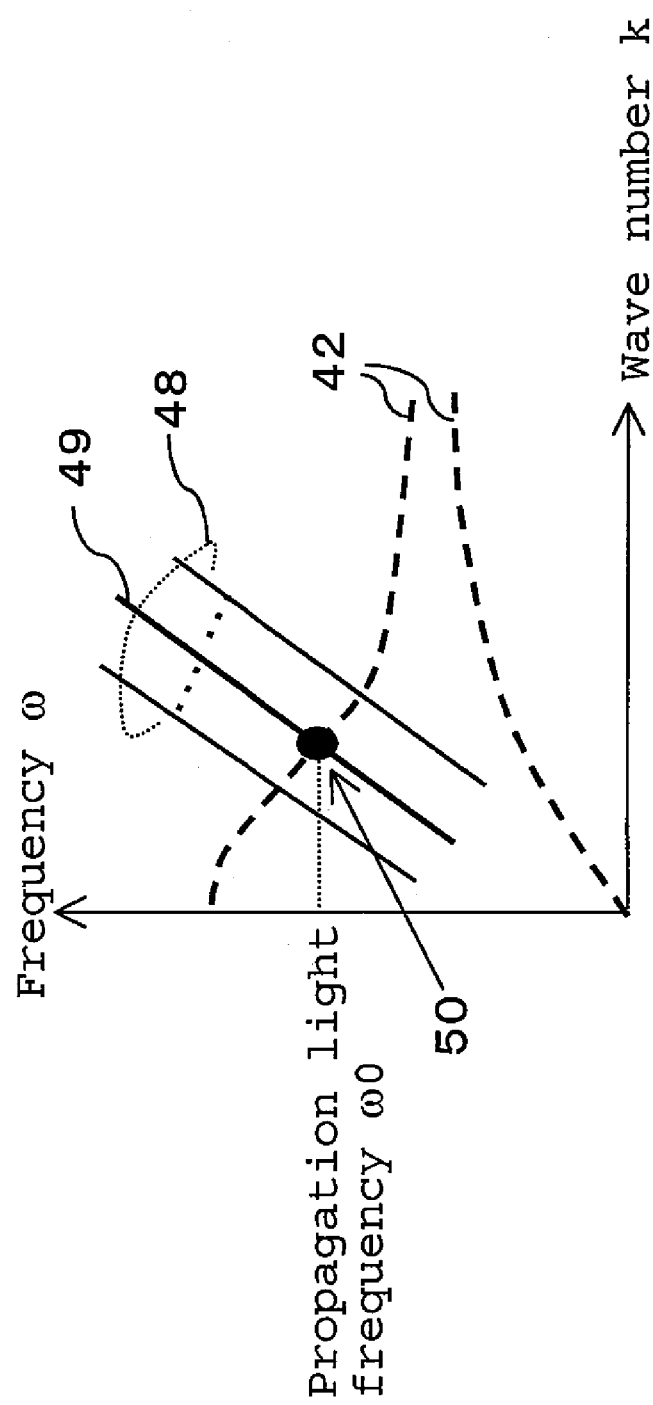

FIG. 9(A) is a schematic side sectional view showing the configuration of a mode coupling optical modulator in accordance with Embodiment 6 of the present invention. FIG. 9(B) shows a schematic diagram of the dispersion properties of the mode coupling optical modulation. The same components as those in FIG. 1 are denoted by the same reference numerals.

A waveguide in the mode coupling optical modulator in accordance with Embodiment 6 is a refractive index distribution (GI) waveguide 19 having a refractive index distribution in which the refractive index varies in the direction perpendicular to the propagation light. The other arrangements are similar to those of the mode coupling optical modulator in accordance with Embodiment 1, shown in FIG. 1.

The GI waveguide 19 has the refractive index distribution in which the refractive index has the maximum value at least in the center of the waveguide in a film thickness direction thereof and decreases parabolically according to the distance from the center. The shading (expressed by the varying density of dots) in the GI waveguide 19, shown in FIG. 9(A) indicates a variation in refractive index. A darker portion (having dense dots) indicates a greater refractive index than a lighter portion (having sparse dots).

When the product of the optical path length of the two-dimensional GI waveguide 19 and the square root of a focusing parameter is set almost equal to a multiple integral of $\pi/2$, the GI waveguide 19 can provide a lens function and easily achieve the optical coupling between an input side and an output side. With the above settings, the input light 5 is coupled to the surface plasmons 8, has the intensity thereof modulated, and is focused on an output position of the GI waveguide 19 to output output light 33 with a small beam diameter as shown in FIG. 9(A).

The dispersion property of the GI waveguide 19 is such that the waveguide modes have an equal inclination as shown by a dispersion curve 48 for a waveguide mode of photons in FIG. 9(B). The other arrangements of the present embodiment are similar to those of Embodiment 1. A dispersion curve 49 for a resonance mode of the photons contained in the dispersion curve 48 for the waveguide mode of the photons shares a resonance point 50 with a dispersion curve 42 for the surface plasmons 8 localized at the interface between the two-dimensional periodic metal layer 2 and the electrooptical material layer 3.

The GI waveguide 19 can be produced using a material such as polysilane (a material consisting mainly of polysilane).

Polysilane has the high-refractive-index polysilane structure thereof changed to a low-refractive-index siloxane structure in response to an oxidation reaction during hardening caused by exposure to ultraviolet rays or thermal treatment. By utilizing the oxidation reaction to, for example, irradiate polysilane of a uniform refractive index with ultraviolet rays via a mask plate having a transmittance distribution in which an ultraviolet transmittance varies depending on the position, it is possible to vary the intensity of the ultraviolet rays depending on the irradiation position to form, in the polysilane, a refractive index distribution corresponding to the intensity of the ultraviolet rays.

Figure 11C:
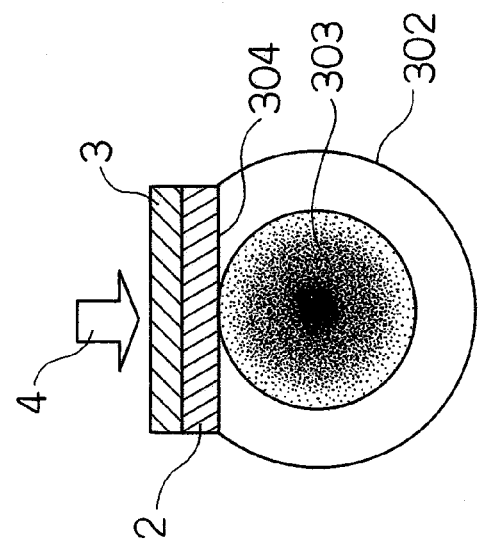
FIG. 11(C) is a sectional view showing a configuration utilizing a GI optical fiber as an example of the mode coupling optical modulator in accordance with Embodiment 6 of the present invention.
Figure 11B:
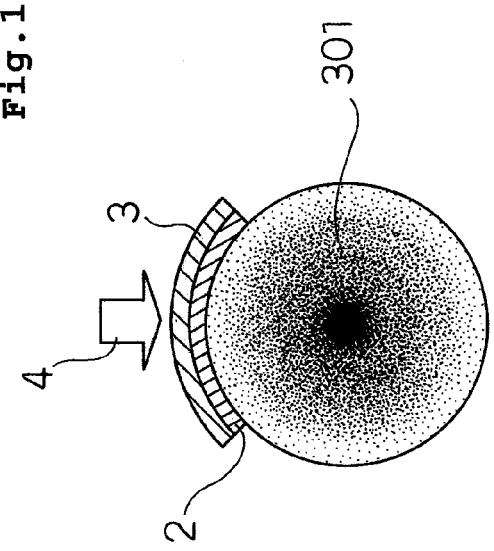
FIG. 11(B) is a sectional view showing a configuration utilizing a GI optical fiber as an example of the mode coupling optical modulator in accordance with Embodiment 6 of the present invention.
Figure 11A:
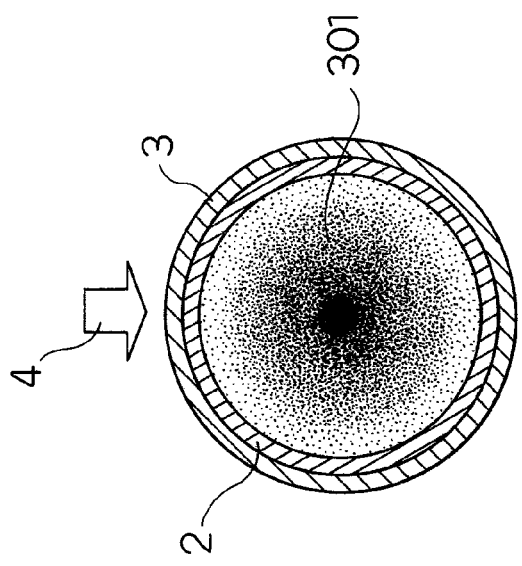
FIG. 11(A) is a sectional view showing a configuration utilizing a GI optical fiber as an example of the mode coupling optical modulator in accordance with Embodiment 6 of the present invention.

Specific arrangements included in a conceptual drawing of the GI waveguide shown in FIG. 9(A) include, for example, a stack of the two-dimensional periodic metal layer 2 and electrooptical material layer 3 on and in contact with a core 201 in a channel waveguide 201 as shown in FIGS. 10(A) and 10(B), and the use of a GI optical fiber as shown in FIG. 11(A) to 11(C). In FIG. 11(A), the two-dimensional periodic metal layer 2 and electrooptical material layer 3 are concentrically stacked around and in contact with the periphery of a GI optical fiber (core) 301. In FIG. 11(B), the two-dimensional periodic metal layer 2 and electrooptical material layer 3 are stacked on and in contact with a part of the GI optical fiber (core) 301. FIG. 11(C) shows an example in which a GI optical fiber 302 has a thick clad layer and in which the two-dimensional periodic metal layer 2 and electrooptical material layer 3 are stacked on and in contact with the core on a ground surface 304 of the optical fiber 302 which is obtained by surface grinding.

The examples in FIGS. 10(A) to 11(C) show the refractive index distribution in which the refractive index decreases depending on the distance from the center axis of the core. However, the present invention is not limited to this. For example, the waveguide may have a refractive index distribution (not shown) in which the plate-like GI waveguide 201 exhibits the maximum refractive index on a reference plane in the center of the core in the thickness direction thereof and in which the refractive index decreases from the reference plane toward a side surface of the core which is closer to the two-dimensional periodic metal layer 2 and toward the opposite side surface of the core.

Furthermore, in FIGS. 10(A) and 10(B), the refractive index decreases from the center axis toward each side of the core. FIGS. 10(A) and 10(B), schematically showing the distribution of the refractive index, further show that an area with the same refractive index is shaped almost like a small square at the center and that the shape of the area with the same refractive index is gradually enlarged just homothetically in scale as the area approaches the periphery of the core.

In contrast, FIGS. 11(A) to 11(C) show that an area with the same refractive index is shaped almost like a small circle and that the shape of the area with the same refractive index is gradually enlarged concentrically in scale as the area approaches the periphery of the core.

Furthermore, in connection with FIGS. 10(A) and 10(B), the present invention is not limited to the above refractive index distributions. For example, the area with the same refractive index may be shaped like a small circle in the center of the core as shown in FIG. 11(A) and may vary gradually to a larger square as the area approaches the periphery of the core as shown in FIG. 10(A).

As described above, in the optical modulator and optical modulation method in accordance with the present invention, the periodic structure with a period that is about equal to the wavelength is formed in the metal layer between the waveguide and electrooptical material layer. This makes it possible to excite the high order mode of the surface plasmons localized at the interface between the electrooptical material layer and the metal layer which mode can be resonated with the propagation mode in the waveguide, even if the electrooptical material layer is made of the high dielectric having a high electrooptical constant, such as $LiNbO_3$ or KTP, which has a greater refractive index than glass and resin, commonly used as waveguide materials. This enables the electrooptical material optimum for optical modulation to be selected as the electrooptical material layer. That is, the high dielectric having a high electrooptical constant can be used as the electrooptical material layer.

Figure 12:
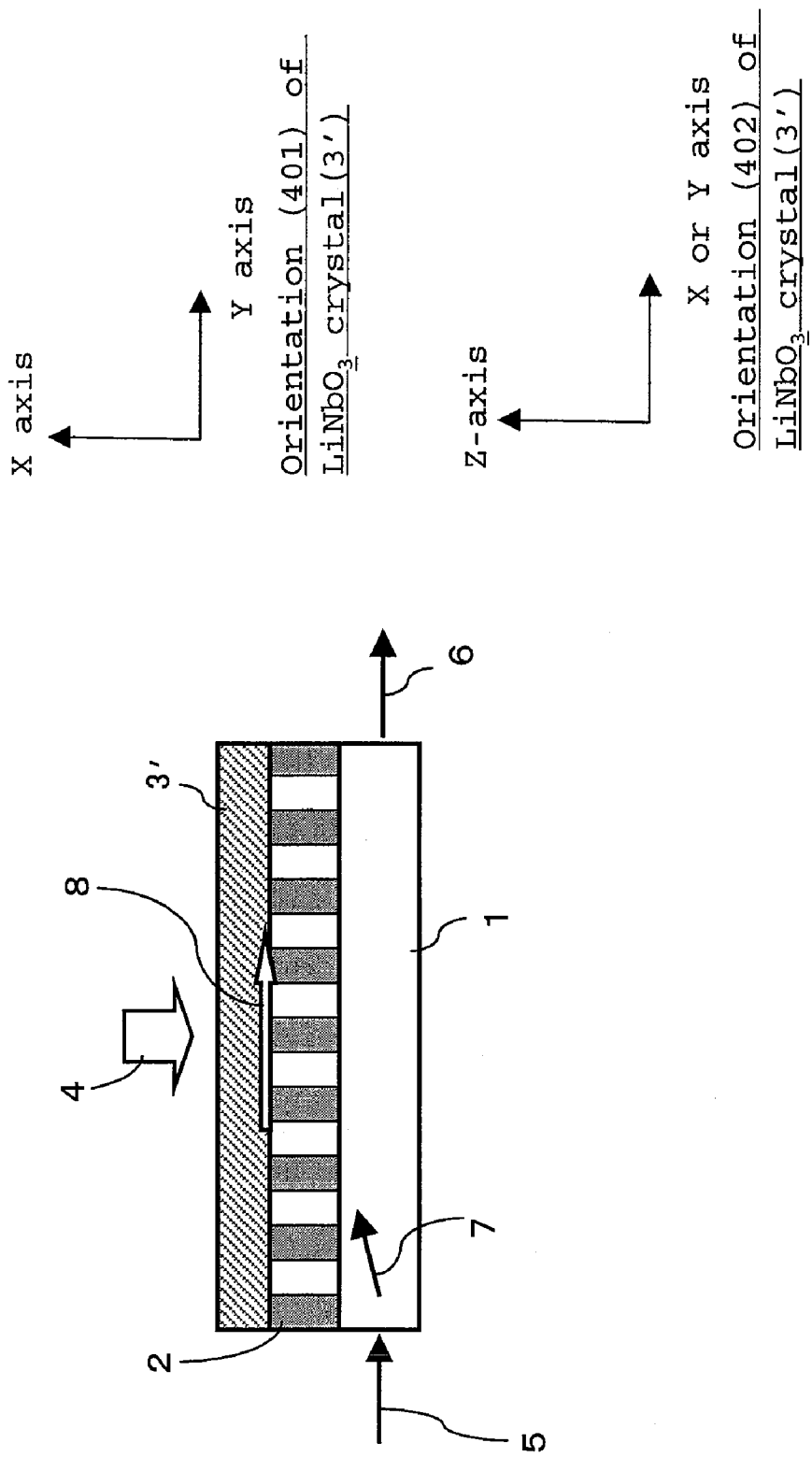
FIG. 12 is a diagram illustrating how to select the orientation of a LiNbO$_3$ crystal used in a mode coupling optical modulator in accordance with an embodiment of the present invention.

If $LiNbO_3$ crystal 3' is used as the electrooptical material layer 3, sensitivity can be improved by setting the orientation of a $LiNbO_3$ crystal 3' so that the propagation direction corresponds to a Y axis direction, while the stacking direction corresponds to an X axis direction (in FIG. 12, this is expressed as an orientation 401 of the $LiNbO_3$ crystal 3') or so that the propagation direction corresponds to the X or Y axis direction, while the stacking direction corresponds to a Z axis direction (in FIG. 12, this is expressed as an orientation 402 of a $LiNbO_3$ crystal 3') as shown in FIG. 12.

Furthermore, in the above description of Embodiment 5, the input light 5 is made of a single beam, and the output beam 31 is made of a plurality of beams. However, the present invention is not limited to this. The configuration of the above embodiment is also applicable to the case in which the input light 5 is made of a plurality of beams, while the output beam 31 is made of a single beam. A diagram for this case can be obtained by replacing the input light and output light with each other in FIG. 8.

The optical modulator and optical modulation method in accordance with the present invention are useful as a mode coupling optical modulator, an optical modulation method, and the like which are effective for enabling the surface plasmons to resonate with the propagation light without relying on the refractive index of the material located in proximity to the metal film, allowing the intensity of light to be modulated on the basis of the interaction between the light and the surface plasmons.

What is claimed is:

1. An optical modulator comprising:
a waveguide on which propagation light is incident;
a metal layer located adjacent to the waveguide and having a periodic structure which periodically extends along at least in a propagation direction of the waveguide; and
a dielectric layer located adjacent to a surface of the metal layer which is opposite a surface to which the waveguide is adjacent, the dielectric layer having an electrooptical effect, wherein the waveguide is a multimode waveguide that enables multimode propagation in at least one direction perpendicular to the propagation direction.

2. The optical modulator according to claim 1, wherein a period of the periodic structure is a two-dimensional period along the propagation direction which is at least 0.1 times and at most 1.5 times as large as the wavelength of the propagation light.

3. The optical modulator according to claim 1, wherein the propagation light incident on the waveguide is linearly polarized light.

4. The optical modulator according to claim 1, further comprising an electrode located via the dielectric layer and opposite the metal layer.

5. The optical modulator according to claim 1, wherein the propagation light is wavelength multiplexed light that propagates at a plurality of wavelengths.

6. The optical modulator according to claim 1, wherein the multimode waveguide has a maximum refractive index portion and a refractive index distribution portion in a direction perpendicular to the propagation direction, the refractive index distribution portion having a refractive index decreasing monotonously depending on a distance from the maximum refraction portion.

7. The optical modulator according to claim 6, wherein in the refractive index distribution portion, the refractive index varies symmetrically with respect to a center of the maximum refractive index portion and substantially parabolically depending on a distance from the center, and
the product of an optical length and a square root of a focusing parameter is substantially an integral multiple of $\pi/2$.

8. The optical modulator according to claim 6, wherein the multimode waveguide is made of a polysilane-containing resin.

9. The optical modulator according to claim 1, wherein the multimode waveguide has a predetermined uniform refractive index, and at least one of the number of input sections on an input surface and the number of output sections on an output surface varies depending on a waveguide width in a multimode direction and a propagation length.

10. The optical modulator according to claim 1, further comprising a beam converting section on an input side of the multimode waveguide to reduce the beam size of the propagation light.

11. The optical modulator according to claim 10, wherein the propagation light having the beam size reduced by the beam converting section is incident on a position located away from a center of the multimode waveguide.

12. The optical modulator according to claim 10, wherein the propagation light having the beam size reduced by the beam converting section is incident on the multimode waveguide at an angle different from that of an optical axis of the multimode waveguide.

13. An optical modulation method comprising the steps of:
providing an optical modulator having i) a waveguide on which propagation light is incident, ii) a metal layer located adjacent to the waveguide and having a periodic structure which periodically extends along at least in a propagation direction of the waveguide, and iii) a dielectric layer located adjacent to a surface of the metal layer which is opposite a surface to which the waveguide is adjacent, the dielectric layer having an electrooptical effect; and
varying an electric field applied to the dielectric layer to vary the refractive index of the dielectric layer and thus a light quantity of the propagation light, wherein the waveguide is a multimode waveguide that enables multimode propagation in at least one direction perpendicular to the propagation direction.

* * * * *

UNITED STATES PATENT AND TRADEMARK OFFICE
CERTIFICATE OF CORRECTION

| | | |
|---|---|---|
| PATENT NO. | : 7,471,852 B2 | Page 1 of 1 |
| APPLICATION NO. | : 11/867866 | |
| DATED | : December 30, 2008 | |
| INVENTOR(S) | : Hidenobu Hamada | |

It is certified that error appears in the above-identified patent and that said Letters Patent is hereby corrected as shown below:

On the Cover Page, add item [30], Foreign Application Priority Data, "October 6, 2006 (JP) 2006-274550"

Signed and Sealed this

Fifth Day of May, 2009

JOHN DOLL
*Acting Director of the United States Patent and Trademark Office*